US010266643B2

United States Patent
Liska et al.

(10) Patent No.: US 10,266,643 B2
(45) Date of Patent: Apr. 23, 2019

(54) INITIATORS AND USE THEREOF FOR CATIONIC PHOTOPOLYMERIZATION

(71) Applicants: Technische Universitaet Wien, Vienna (AT); Albert-Ludwigs-Universitaet Freiburg, Freiburg im Breisgau (DE)

(72) Inventors: Robert Liska, Schleinbach (AT); Daniel Bomze, Vienna (AT); Ingo Krossing, Feiburg im Breisgau (DE); Patrick Knaack, Vienna (AT)

(73) Assignees: Technische Universitaet Wien, Vienna (AT); Albert-Ludwigs-Universitaet Freiburg, Freiburg im Breisgau (DE)

( * ) Notice: Subject to any disclaimer, the term of this patent is extended or adjusted under 35 U.S.C. 154(b) by 0 days.

(21) Appl. No.: 15/757,008

(22) PCT Filed: Sep. 2, 2016

(86) PCT No.: PCT/AT2016/060048
§ 371 (c)(1),
(2) Date: Mar. 2, 2018

(87) PCT Pub. No.: WO2017/035552
PCT Pub. Date: Mar. 9, 2017

(65) Prior Publication Data
US 2018/0244836 A1 Aug. 30, 2018

(30) Foreign Application Priority Data

Sep. 2, 2015 (AT) ..................... 577/2015

(51) Int. Cl.
*C08G 59/68* (2006.01)
*C08G 65/10* (2006.01)
*C01F 7/02* (2006.01)
*C01F 7/50* (2006.01)

(52) U.S. Cl.
CPC .............. *C08G 59/682* (2013.01); *C01F 7/02* (2013.01); *C01F 7/50* (2013.01); *C08G 59/68* (2013.01); *C08G 59/687* (2013.01); *C08G 65/105* (2013.01)

(58) Field of Classification Search
None
See application file for complete search history.

(56) References Cited

FOREIGN PATENT DOCUMENTS

| DE | 10063066 A1 | 6/2001 |
| EP | 1061101 A2 | 12/2000 |
| EP | 2223948 A1 | 9/2010 |
| WO | 2013168103 A1 | 11/2013 |

OTHER PUBLICATIONS

Downing et al., "Bis(alkylthioethyl)amine Complexes of Molybdenum," Organometallics, vol. 28, No. 8, pp. 2417-2422 (2009).
Int'l Preliminary Report on Patentability dated Jan. 11, 2017 in Int'l Application No. PCT/AT2016/060048.
Krossing et al., "Relative Stabilities of Weakly Coordinating Anions: A Computational Study," Chem. Eur. J., vol. 10, No. 20, pp. 5017-5030 (2004).
Search Report dated May 27, 2016 in AT Application No. A 577/2015.
Zhang et al., "Odd-Electron-Bonded Sulfur Radical Cations: X-ray Structural Evidence of Sulfur-Sulfur Three-Electron .sigma.-Bond," Journal of the American Chemical Society, vol. 136, No. 42, pp. 14666-14669 (2014).

*Primary Examiner* — Clinton A Brooks
(74) *Attorney, Agent, or Firm* — Panitch Schwarze Bellisario & Nadel LLP

(57) ABSTRACT

The invention relates to the use of aryliodonium and/or arylsulfonium salts of the tetrakis(perfluoro-t-butyloxy)aluminate anion of the following formula (I):

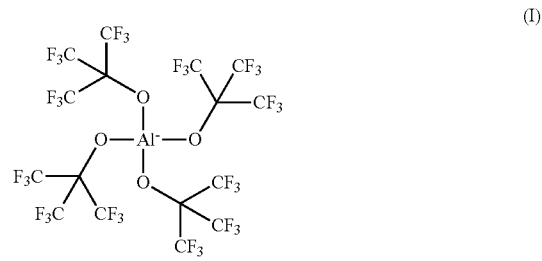

as cationic initiators cleavable by light and/or free radicals for polymerizing cationically polymerizable monomers.

13 Claims, 17 Drawing Sheets

INITIATORS AND USE THEREOF FOR CATIONIC PHOTOPOLYMERIZATION

CROSS-REFERENCE TO RELATED APPLICATIONS

This application is a Section 371 of International Application No. PCT/AT2016/060048, filed Sep. 2, 2016, which was published in the German language on Mar. 9, 2017 under International Publication No. WO 2017/035552 A1, which claims priority under 35 U.S.C. § 119(b) to Austrian Application No. A 577/2015, filed Sep. 2, 2015, the disclosures of which are incorporated herein by reference in their entirety.

The present invention relates to the use of novel aryliodonium and arylsulfonium salts as initiators for cationic photopolymerization.

STATE OF THE ART

For several years, using onium salts as photoinitiators for cationic photopolymerisation has been a reliable technique, iodonium and sulfonium salts being amongst the most commonly initiators used. Such cationic photoinitiators are also known as photoacidifiers or photoacid generators, transitioning into an excited state when irradiated with light (typically, UV light), wherein a bond will be cleaved homo- or heterolytically, whereafter a hydrogen atom is abstracted from other molecules present within the reaction mixture, preferably from the cationically polymerizable monomers, in order to form a so-called photoacid with the anion of the iodinium or sulfonium cation. Said photoacid will preferably be a very strong acid, e.g., a superacid, itself protonating a monomer and thereby initiating cationic polymerization. Therefore, the iodonium and sulfonium cations, respectively, are typically present in such salts combined with an anion corresponding to a very strong acid, which should additionally have low nucleophilicity.

WO 99/12938 A1 discloses anions of the following formula:

$$[M_1(XC(CF_a(R_1)_b)(CF_c(R_2)_d)R_3)_m(R_4)_n]^{-p}$$

wherein:
M$_1$ is a transition metal or a group-III, -IV or -V element;
p is 1 or 2;
X is independently selected from O, S or NR$_5$R$_6$;
R$_1$ and R$_2$ are independently selected from H, halo, or C$_{1-4}$ alkyl;
R$_3$ is independently selected from H, C$_{1-4}$ alkyl or C$_{4-20}$ aryl;
R$_4$ is independently selected from C$_{1-10}$ alkyl, C$_{1-10}$ alkoxide or C$_{4-20}$ aryloxide;
R$_5$ and R$_6$ are independently selected from H or C$_{1-20}$ alkyl;
a and c are integers independently selected from 0 to 3;
a+b is 3;
c+d is 3;
m is an integer from 2 to 8; and
n is an integer from 0 to 4;
provided that at least one of a and c is not 0.

Lithium tetrakis(perfluoro-t-butyloxy)aluminate, LiAl(P-FTB)$_4$, is disclosed therein as one specific compound from among the huge number of possible combinations, which is synthesized and characterized thereinafter in Example 17. However, the electrical or other properties of this salt were not examined and therefore it merely constitutes one out of many effectively synthesized examples of that invention.

Generally, any anions with the above formula disclosed in WO 99/12938 A1 should be suitable for electro-chemical devices as a result of their good electrical conductivity, wherein a metal cation, a phosphonium cation, an ammonium cation or a sulfonium cation can be used as the counterion M.

Subsequently, I. Raabe, A. Reisinger and I. Krossing, "Efficient syntheses of Li[Al(ORF)$_4$], Ag[Al(ORF)$_4$] (RF=C(CF$_3$)$_3$, C(H)(CF$_3$)$_2$, C(CH$_3$)(CF$_3$)$_2$)) and [H(OEt$_2$)$_2$]$^+$[Al(OC(CF$_3$)$_3$)$_4$]$^-$", H. W. Roesky and Dietmar K. Kennepohl (ed.), Experiments in Green and Sustainable Chemistry, Wiley VCF, p. 131-144 (2009), disclose an efficient method for producing lithium tetrakis(perfluoro-t-butyloxy)aluminate.

Against this background, the aim of the present invention consisted in developing novel initiators excelling due to improved properties as compared to known initiators.

DISCLOSURE OF THE INVENTION

The present invention succeeds in reaching this aim by providing the novel use of aryliodonium and/or arylsulfonium salts of the tetrakis(perfluoro-t-butyloxy)aluminate anion of the following formula (I):

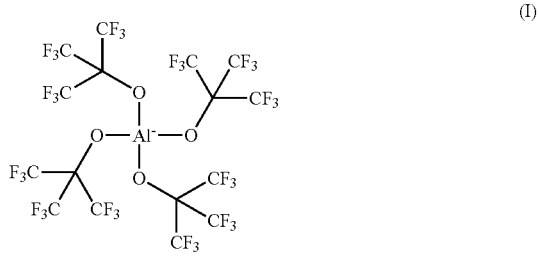

(I)

as cationic initiators cleavable by light and/or free radicals for polymerizing cationically polymerizable monomers.

Particularly, within the course of their investigations, not only have the inventors found that the anion of formula (I) known from WO 99/12938 A1, independently of its electrical conductivity, is also suitable for cationic initiators when combined with common iodonium or sulfonium cations, which was expected by the inventors, but surprisingly they have also found that these novel initiators are clearly superior to common cationic iodonium and sulfonium salt photoinitiators in several aspects, as will be demonstrated by the examples below.

In preferred embodiments of the invention, either diphenyliodonium-tetrakis(perfluoro-t-butyloxy)aluminate of the following formula (II):

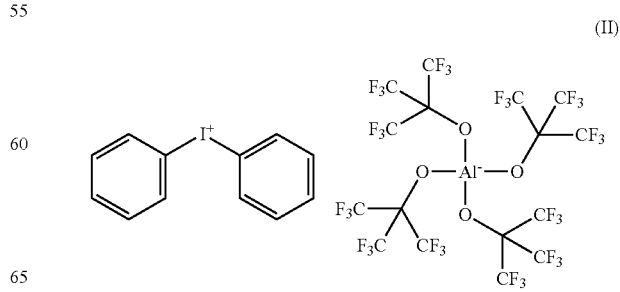

(II)

or triphenylsulfonium-tetrakis(perfluoro-t-butyloxy)aluminate, optionally substituted with phenylthio or 4-diphenylsulfoniophenylthio, of the following formula (III):

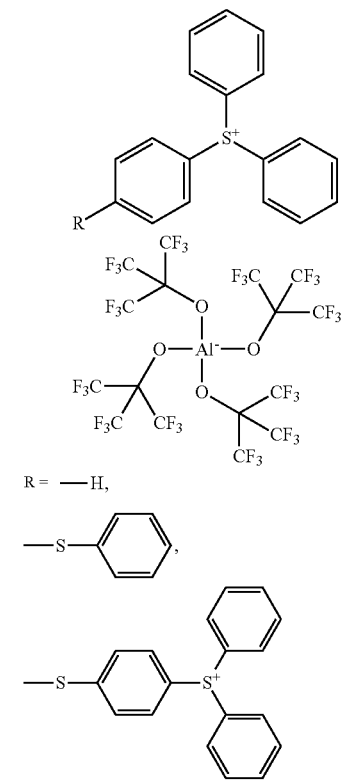

or tris(4-((4-acetylphenyl)thio)phenyl)sulfonium-tetrakis(perfluoro-t-butyloxy)aluminate of the following formula (IV):

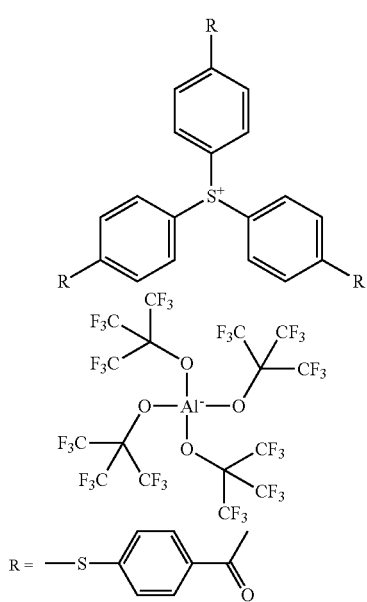

or, alternatively, a mixture thereof are used, as these compounds have already yielded excellent results. Nonetheless, it must be assumed that the benefits of the tetrakis(perfluoro-t-butyloxy)aluminate anion of formula (I) will also be obtainable with other aryliodonium and arylsulfonium cations commonly used in the art; which is why the present invention should not be limited to the compounds of formula (II) and (III). For example, J. V. Crivello and K. Dietliker, "Photoinitiators for Free Radical Cationic & Anionic Photopolymerisation", vol. 3, $2^{nd}$ edition, Wiley, 1999, describe properties of cations known in the literature, such as ferrocenium, triarylselenonium, dialkyl-4-hydroxyphenylsulfonium, dialkylphenacylsulfonium, dialkylacylsulfoxonium, pyrylium and thiopyrylium, amongst which at least some of them are believed to provide benefits comparable to the initiators of the above formula (II) to (IV) in combination with the tetrakis(perfluoro-t-butyloxy)aluminate anion of formula (I) in such a way that their use may be regarded as equally beneficial to that of the cations described above.

The compound mixture of the unsubstituted triphenylsulfonium cation and both variants thereof, substituted with phenylthio and 4-diphenylsulfoniophenylthio, respectively, will be the result of the preparation method which will be described in more detail below, especially considering that the educt triphenyl sulfoniumchloride is only commercially available in the form of a mixture of these three substituent variations (in aqueous solution) from Sigma Aldrich; and that separating these three products could only be achieved at great expense. Due to the excellent efficiency of the mixture, separations like that have never been performed to date.

According to the present invention, the cationic polymerization may be carried out in a common and therefore preferred manner as a ring-opening polymerization, wherein preferably mono- or multivalent epoxides (oxiranes), thiiranes (episulfide), oxetanes, lactames, lactones, lactide, glycolide, tetrahydrofurane, or mixtures thereof are used as cationically polymerizable monomers, in particular one or more multivalent epoxides being monomers which are most often cationically polymerized, as well as non-cyclical monomers, e.g., vinyl ethers.

The reaction mixture to be polymerized may also comprise one or more additional components in a known manner, selected from additional initiators, additional monomers, sensitizers, stabilizers, modifiers, solvents, fillers, dyes, pigments, and mixtures thereof, in order to satisfy the specific requirements for respective polymerizates.

Furthermore, in preferred embodiments, the mixture comprises at least one thermal free radical initiator, in order to be able to carry out the polymerization reaction as a frontal polymerization or even as a thermally initiated ionic polymerization, which is known to persons skilled in the art.

In a second aspect of the invention, the present invention provides the following novel substances diphenyliodonium-tetrakis(perfluoro-t-butyloxy)aluminate of formula (II):

(II)

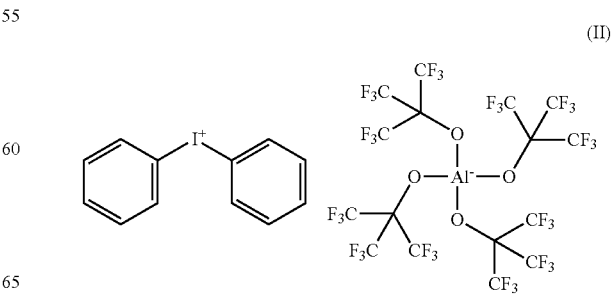

triphenylsulfonium-tetrakis(perfluoro-t-butyloxy)aluminate, partially substituted with phenylthio and 4-diphenylsulfoniophenylthio, of the following formula (III):

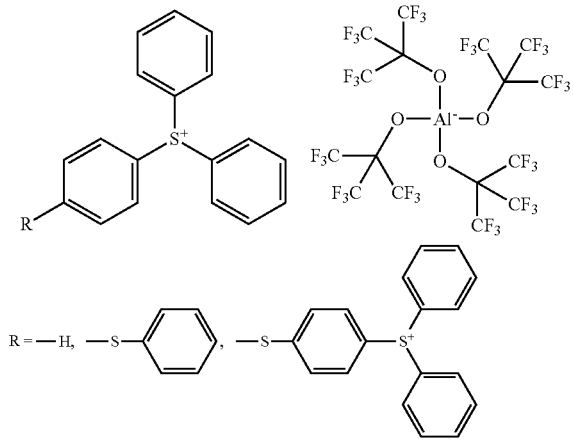

(III)

as well as tris(4-((4-acetylphenyl)thio)phenyl)sulfonium-tetrakis(perfluoro-t-butyloxy)aluminate of the following formula (IV):

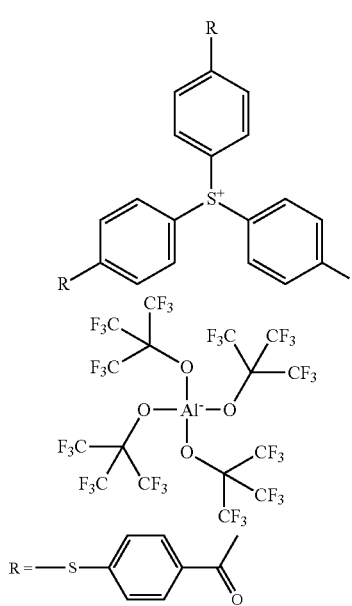

(IV)

which are novel and will be characterized in more detail throughout the examples; and which were produced by the inventors for the very first time and have proven to be excellent initiators for the polymerization of cationically polymerizable monomers.

BRIEF DESCRIPTION OF THE DRAWINGS

The figures show comparisons between initiators according to the invention and known initiators during photo-DSC measurements, including FIGS. 1 and 2 in terms of $t_{max}$, FIGS. 3 and 4 in terms of $t_{95\%}$, and FIGS. 5 and 6 in terms of area, whereas

EXAMPLES

Figure 1:
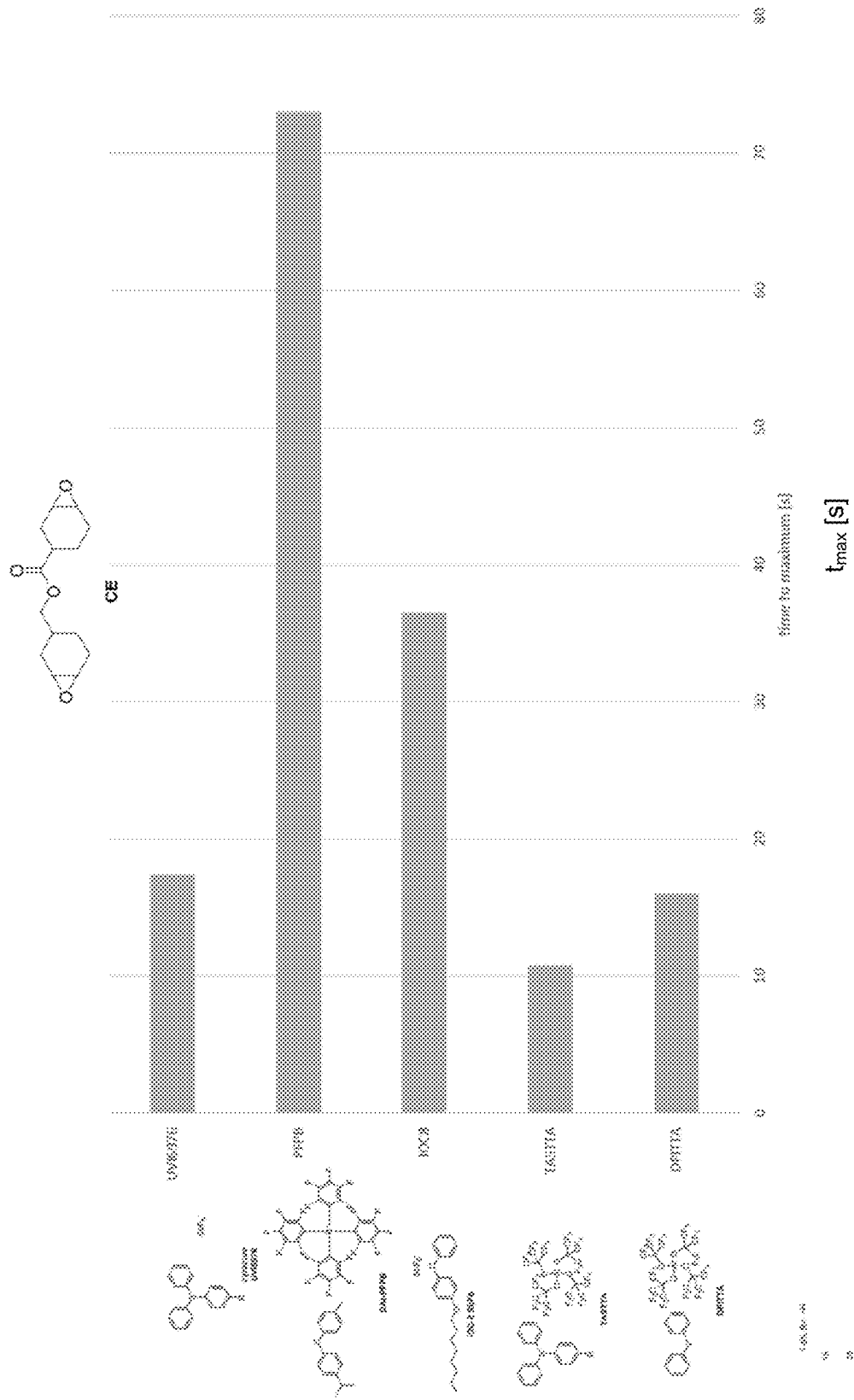

The present invention will now be specifically described through the following examples which are only intended to illustrate the practicability of the invention and are not meant to be understood as limiting.

Example 1

Preparation of diphenyliodonium-tetrakis(perfluoro-t-butyloxy)aluminate (II) (DPITTA)

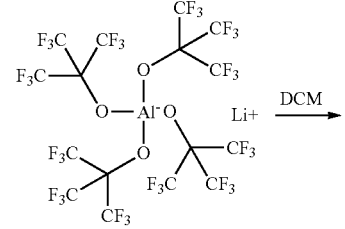

Chemical Formula: $C_{12}H_{10}ClI$   Chemical Formula: $C_{16}AlF_{36}LiO_4$
Molecular Weight: 316.57   Molecular Weight: 974.04

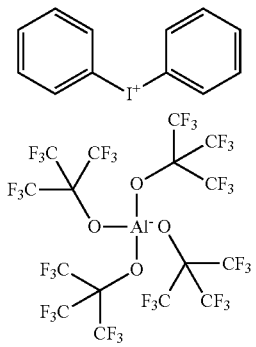

Chemical Formula: $C_{28}H_{10}AlF_{36}IO_4$
Molecular Weight: 1248.21

The entire reaction was performed in argon atmosphere and in a laboratory using orange lighting conditions. Li[Al(OC(CF$_3$)$_3$)$_4$] (1.5622 g, 1.602 mmol; prepared) was precharged in 35 ml of CH$_2$Cl$_2$ without affording a homogenous solution. Iodonium chloride (0.55796 g, 1,762 mmol) was suspended in 25 ml of CH$_2$Cl$_2$ (DCM) and transferred into the reaction flask under a weak argon flow. The already turbid solution turned white and opaque. After 5 h, an additional 20 ml of CH$_2$Cl$_2$ were added to dilute the reaction mixture, and the reaction was stirred overnight. Subsequently, the reaction mixture was transferred into a separating funnel and extracted three times with 40 ml of water each. The organic layer was filtered through silica gel, and the solvent was evaporated, followed by drying in fine vacuum for several hours. The product (1634.8 mg; 82% theor.) was obtained as a white solid.

$^1$H-NMR (200 MHz, CD$_2$Cl$_2$) δ (ppm): 7.58-7.70 (m, 2H), 7.79-7.89 (m, 1H), 7.94-8.03 (m, 2H).

$^{13}$C-NMR (200 MHz, CD$_2$Cl$_2$) δ (ppm): 111.8 (C-I), 121.7 (q, C(CF$_3$), J=291.5 Hz), 134.4 (m), 135.1 (p), 135.5 (o).

$^{27}$Al-NMR (400 MHz, CD$_2$Cl$_2$) δ (ppm): 34.7.

TLC: $R_f$ (CH$_2$Cl$_2$)=0.41

ATR-IR: 1470, 1449, 1351, 1296, 1273, 1239, 1205, 1165, 966, 831, 735, 724, 673, 548, 571, 560, 536 cm$^{-1}$.

Mp.: 171-174° C. (CH$_2$Cl$_2$)

Example 2

Preparation of triphenylsulfonium-tetrakis(perfluoro-t-butyloxy)aluminate, diphenyl-(4-phenylthio)phenylsulfonium-tetrakis(perfluoro-t-butyloxy) aluminate and diphenyl-4-[(4-diphenylsulfonio) phenylthio]phenylsulfonium-tetrakis(perfluoro-t-butyloxy)aluminate (III) (TASTTA)

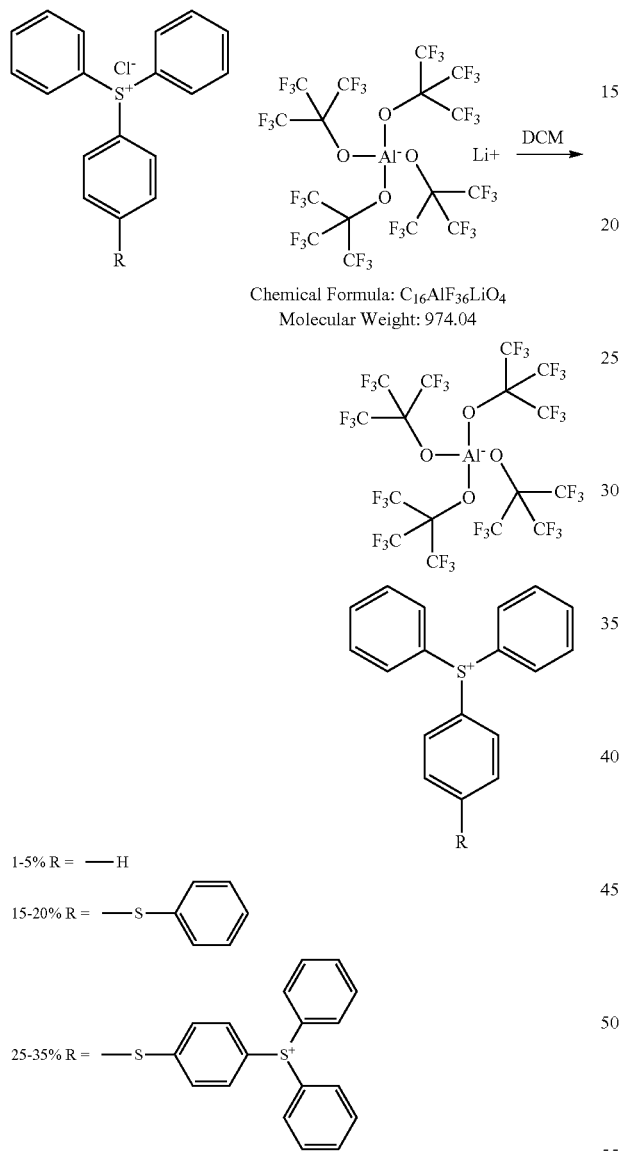

The entire reaction was performed in an argon atmosphere and in a laboratory using orange lighting conditions. Li[Al(OC(CF$_3$)$_3$)$_4$] was precharged into a flask and treated with 120 ml of CH$_2$Cl$_2$ without affording a fully homogenous solution. A 45% solution of triphenyl sulfonium chloride in water, which according to the manufacturer's (Sigma Aldrich) specifications comprised the three compounds bearing the substituents R shown above in a molar ratio of 1:6:10, was added to the flask via a septum using a syringe. Spontaneously, the aqueous layer turned white and solidified after a short period of time. After 5 h, 15 ml of water were added, at which point the solid dissolved. The reaction was stirred overnight. After that, the reaction mixture was transferred into a separation funnel and extracted three times with 40 ml of water each. The organic layer was filtered through silica gel, and the solvent was evaporated, followed by drying in fine vacuum. The product (1490.6 mg; 75% theor.) was obtained as a white solid.

$^1$H-NMR (200 MHz, CD$_2$Cl$_2$) δ (ppm): 7.93-7.82 (m, xH), 7.80-7.70 (m, 2H), 7.69-7.30 (m, 5H).

Due to extensive overlap, an exact classification was not possible. For the same reason, only relative integrals can be given.

$^{27}$Al-NMR (400 MHz, CD$_2$Cl$_2$) δ (ppm): 34.7.

TLC: R$_f$(CH$_2$Cl$_2$)=0.76 and 0.42

ATR-IR: 1574, 1478, 1450, 1351, 1296, 1274, 1239, 1208, 1167, 1065, 968, 829, 817, 744, 725, 682, 559, 536 cm$^{-1}$.

Mp.: 164-167° C. (CH$_2$Cl$_2$)

Examples 3 to 6, Comparative Examples 1 to 6

Reactivity Tests of the New Compounds as Photoinitiators

The new compounds of formula (II), DPITTA and formula (III), TASTTA, were examined through photo-DSC using two different cationically polymerizable monomers, CE and BADGE, in terms of their reactivity as cationic photoinitiators, and compared to that of commonly used initiators, specifically (4-octyloxyphenyl)(phenyl)iodonium-hexafluoroantimonate (IOC-8 SBF6), (4-isopropylphenyl)(4'-methylphenyl)iodonium-tetrakis(pentafluorophenyl)borate (DAI-PFPB) and CYRACURE® UVI 6976 (see the representations depicted on the following page). The entire procedure was conducted with light protection (orange light).

Monomers:

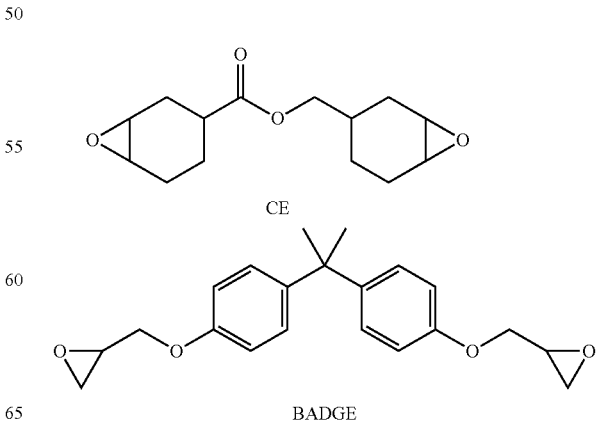

Initiators:

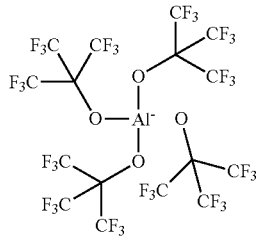

DPITTA
Chemical Formula: $C_{28}H_{10}AlF_{36}IO_4$
Molecular Weight: 1248.21

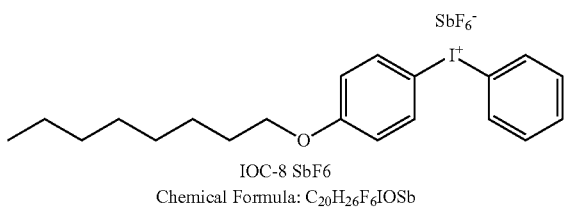

IOC-8 SbF6
Chemical Formula: $C_{20}H_{26}F_6IOSb$
Molecular Weight: 645.07

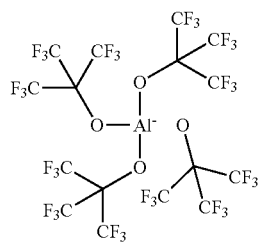

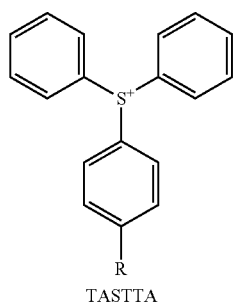

TASTTA

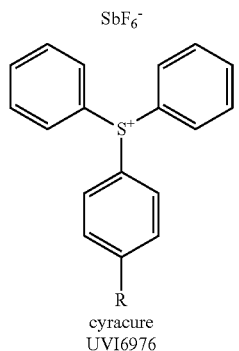

cyracure
UVI6976

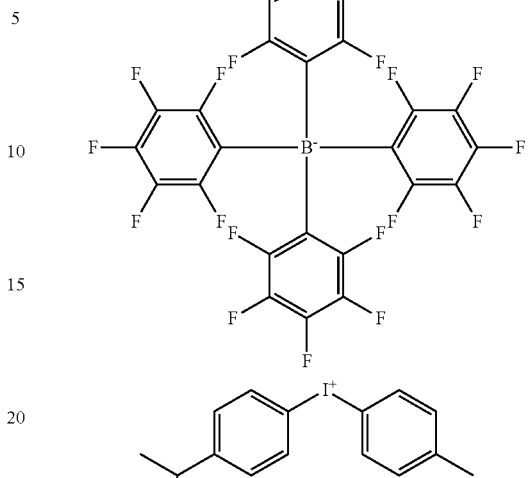

DAI-PFPB
(4-isopropylphenyl)(p-tolyl)iodonium
tetrakis(perfluorophenyl)borate
Chemical Formula: $C_{40}H_{18}BF_{20}I$
Molecular Weight: 1016.25

1-5% R = ——H 15-20% R = —S—

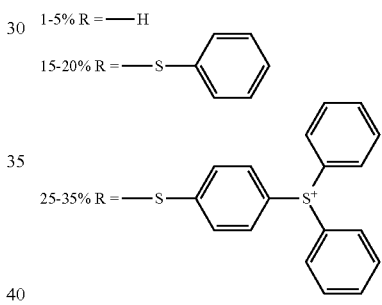

25-35% R =

For all formulations, 1 mol % initiator, based on epoxy groups, was weighed in and magnetically stirred until it had completely dissolved. After that, 10 mg of each reaction mixture were weighed into open aluminum DSC dishes.

DSC measurements were performed on a NETSCH DSC 204 F1 Phoenix under nitrogen atmosphere at 50° C.; irradiation was performed using an Omnicure 2000 mercury-vapor lamp equipped with a wavelength filter of 320-500 nm. The UV light intensity was set to 3 W/cm$^2$; irradiation lasted for 5 mins. All measurements were done in triplicate, and the averaged values for each respective monomer are listed in the tables below.

Therein, $t_{max}$ designates the time until maximum heat generation is reached (in sec), and thus serves as a measure of how fast the gelling point and hence a high initial strength are reached. Here, shorter periods of time are desirable. $T_{95\%}$ designates the time (in sec), after which 95% of total reaction heat were released, and thus constitutes a measure of the reaction rate (again, lower values are desirable). Finally, area designates the area under the curve and is a measure of the reaction heat (in J) released during polymerization per gram of each formulation. Hence, it constitutes a measure for the reaction conversion, which is why it is preferable to obtain higher values in this case.

TABLE 1

| | | CE | | |
|---|---|---|---|---|
| Example | initiator | $t_{max}$ [s] | $t_{95\%}$ [s] | area [J/g] |
| B3 | DPITTA | 16 | 504 | 227 |
| B4 | TASTTA | 11 | 348 | 342 |
| V1 | IOC8 | 37 | 350 | 270 |
| V2 | PFPB | 73 | 540 | 87 |
| V3 | UVI6976 | 17 | 509 | 258 |

TABLE 2

| | | BADGE | | |
|---|---|---|---|---|
| Example | initiator | $t_{max}$ [s] | $t_{95\%}$ [s] | area [J/g] |
| B5 | DPITTA | 33 | 46 | 371 |
| B6 | TASTTA | 25 | 171 | 303 |
| V4 | IOC8 | 38 | 242 | 326 |
| V5 | PFPB | 84 | 355 | 275 |
| V6 | UVI6976 | 25 | 632 | 50 |

Figure 2:
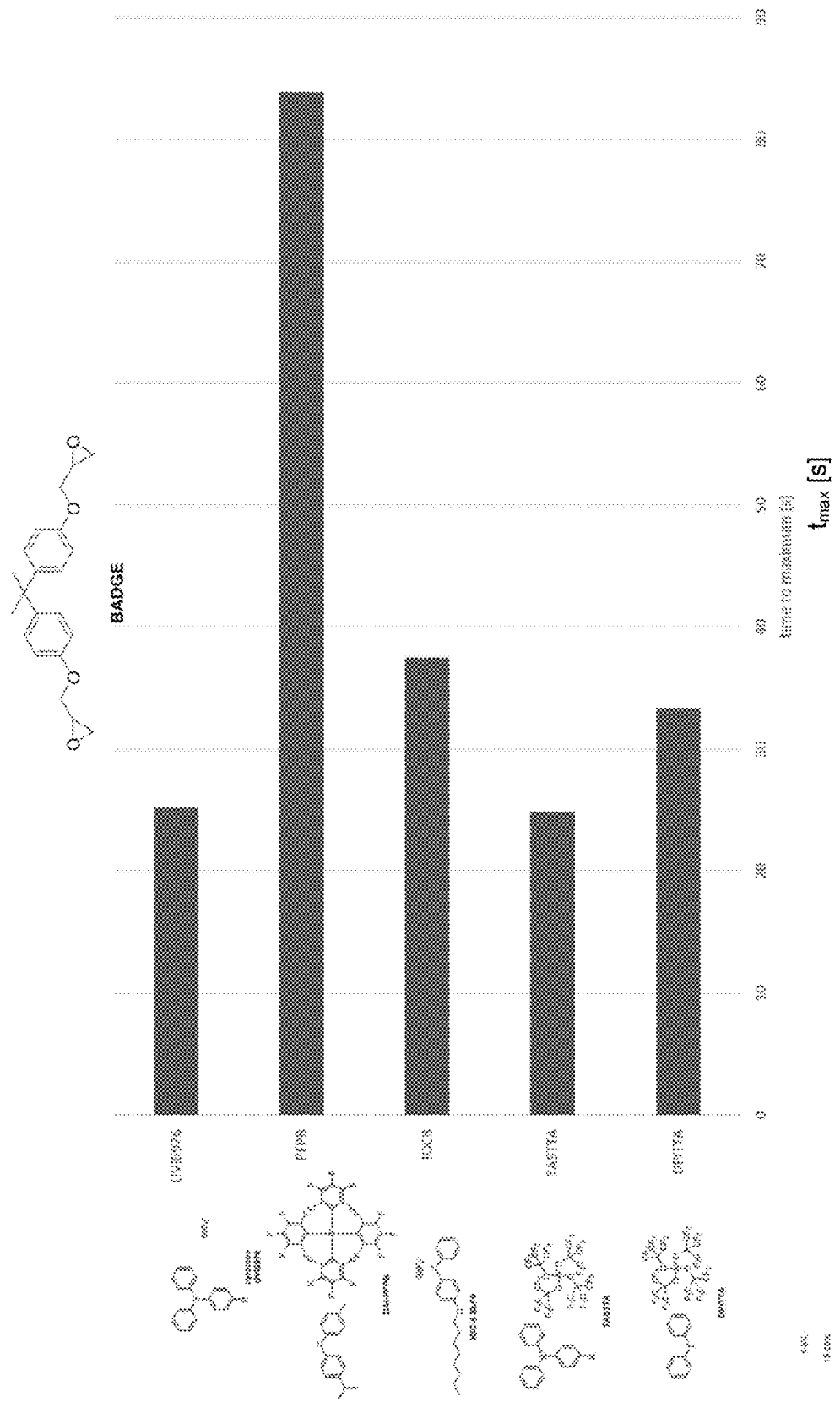
Figure 3:
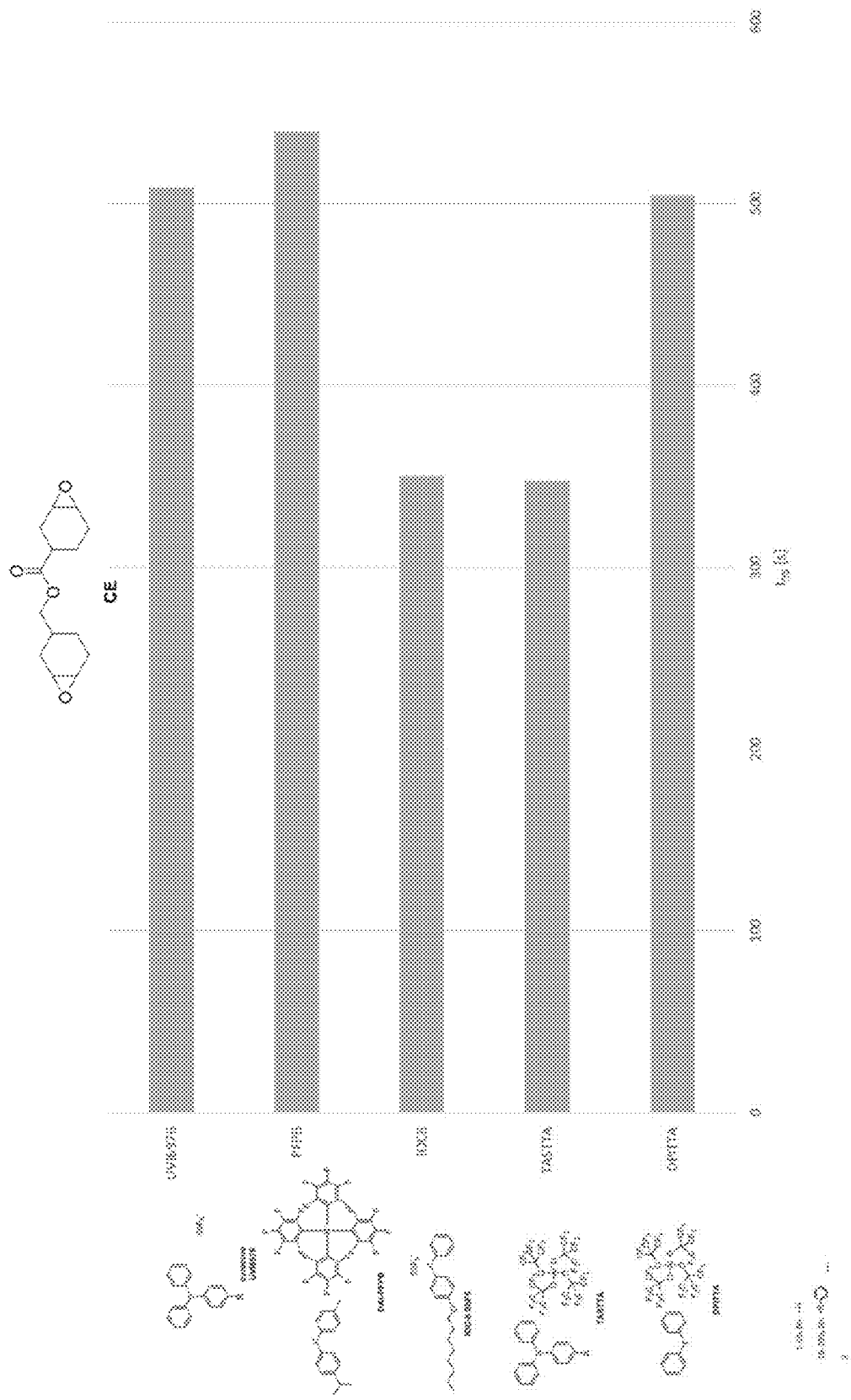
Figure 4:
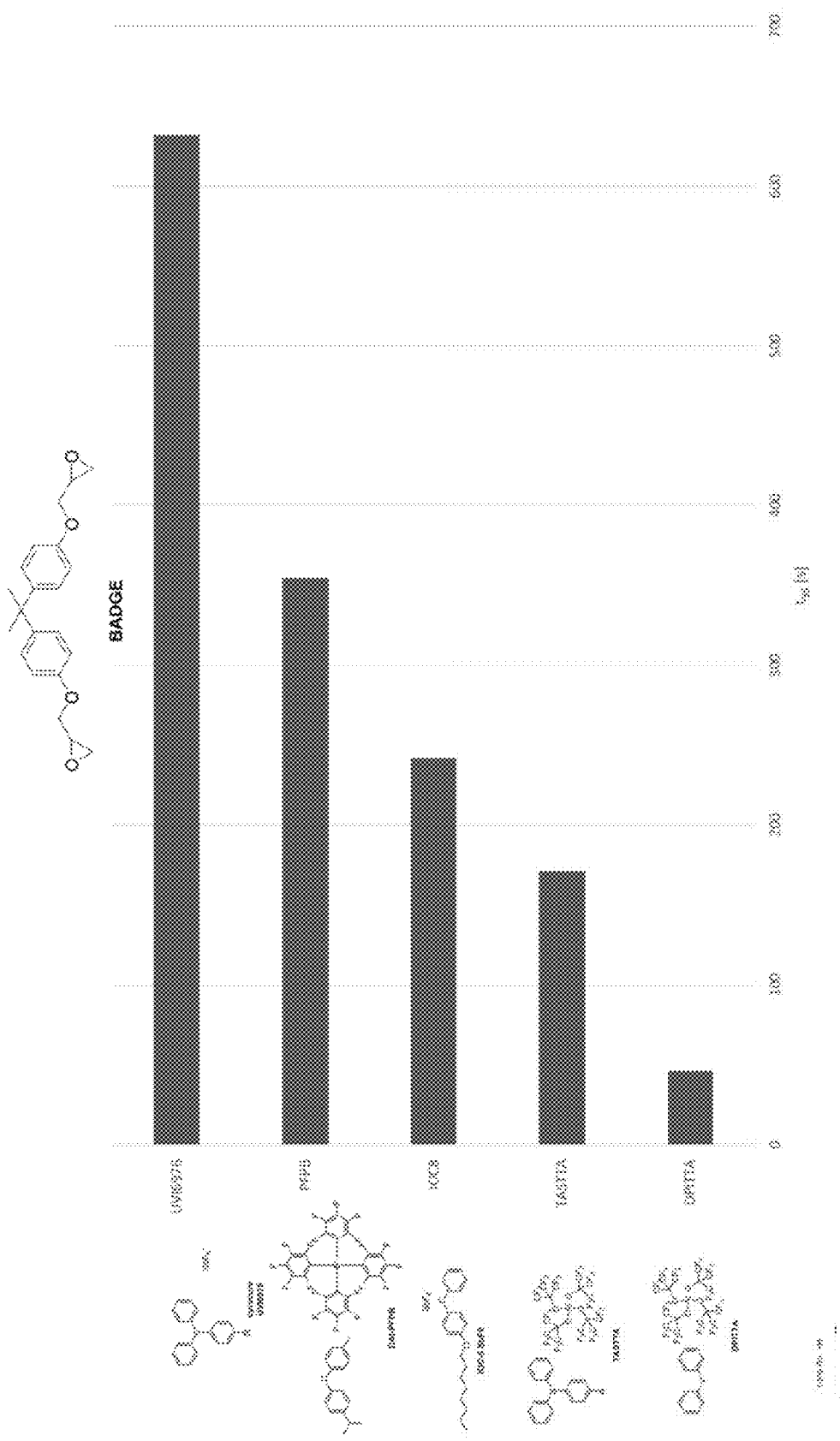
Figure 5:
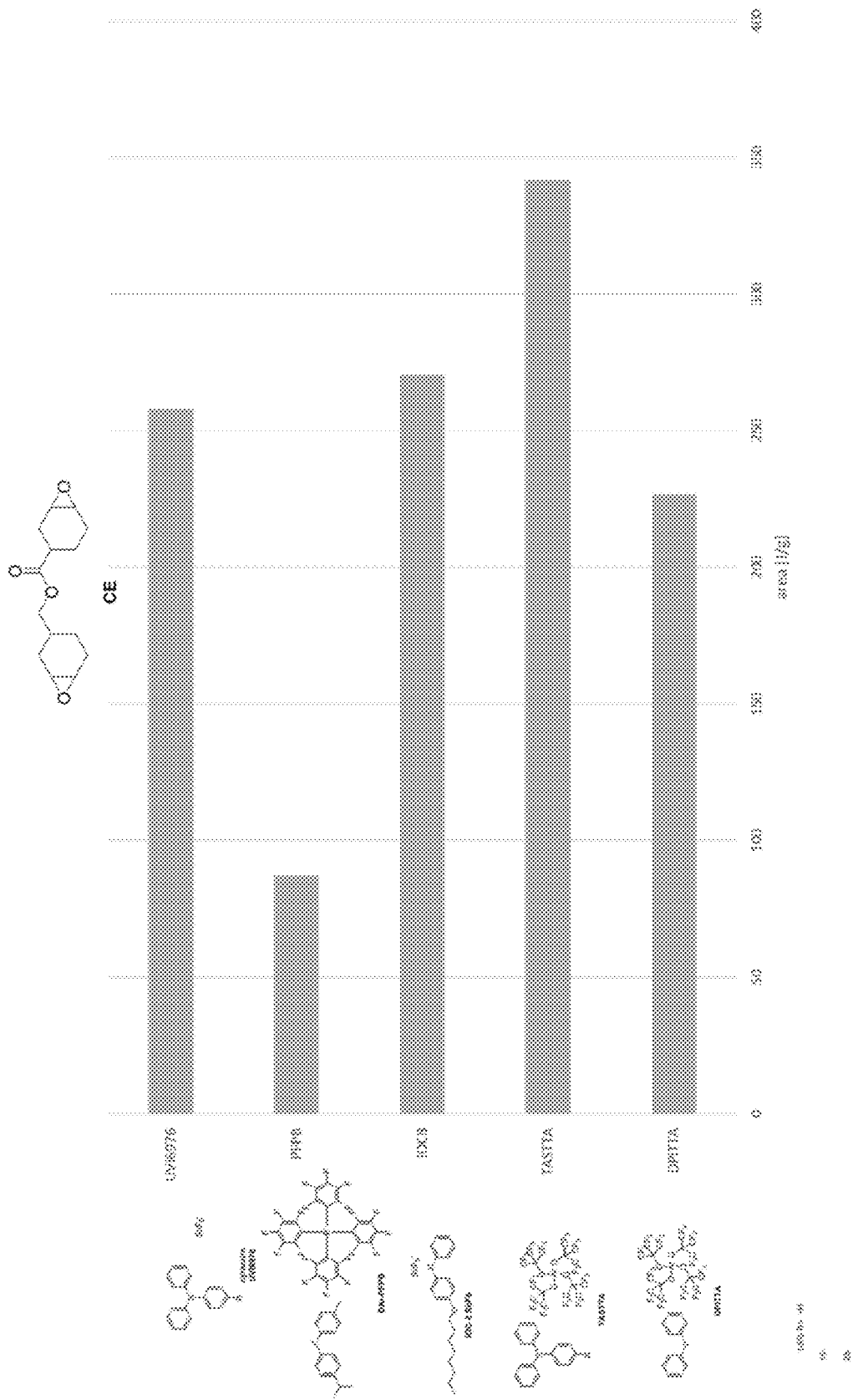
Figure 6:
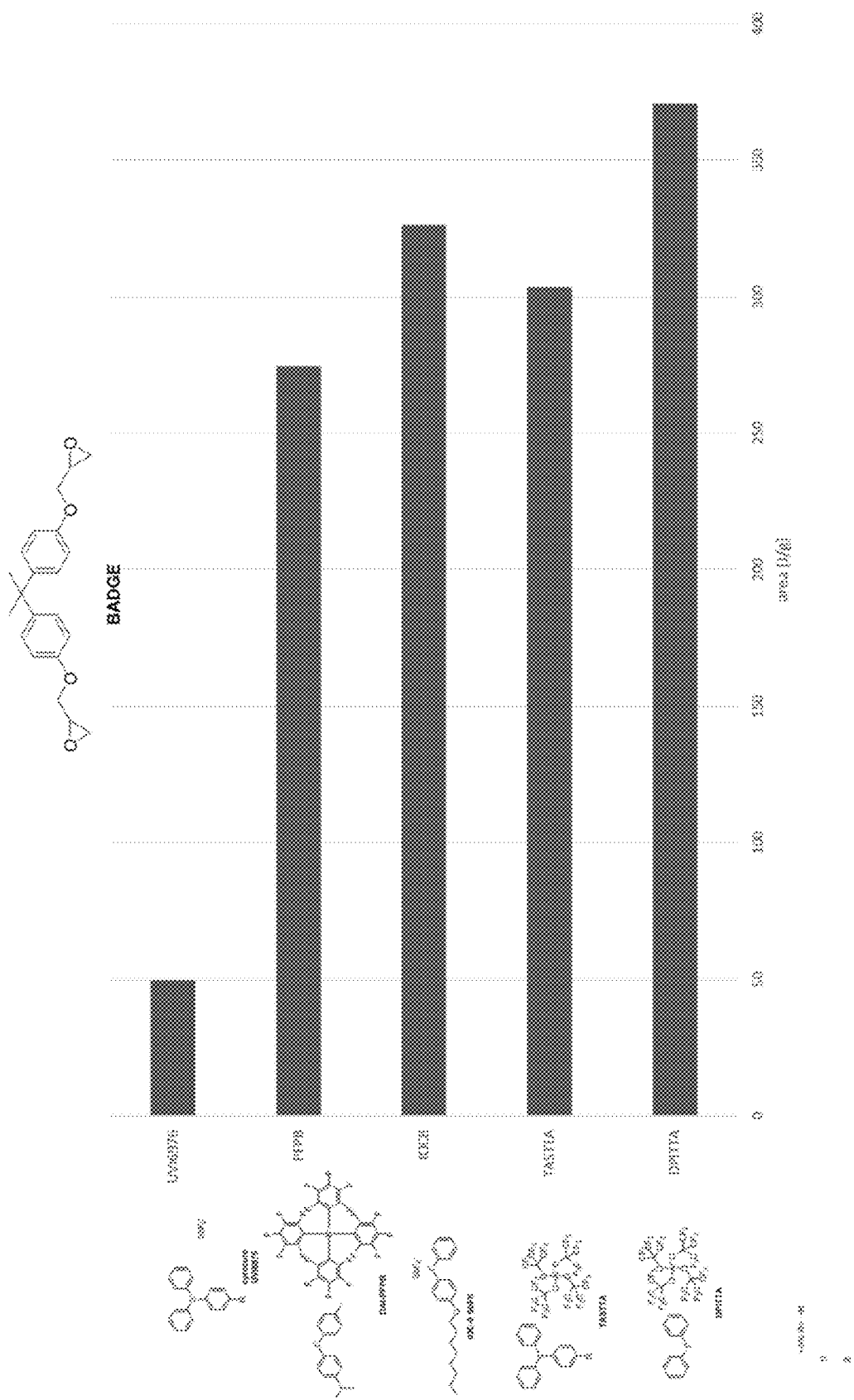

For a better overview, individual graphic representations of the results listed in Tables 1 and 2 above for each of the three reaction parameters are also given in FIGS. 1 through 6, i.e. results for $t_{max}$ are depicted in FIGS. 1 and 2, for $t_{95\%}$ in FIGS. 3 and 4, and for area in FIGS. 5 and 6.

From FIG. 1 showing the results for $t_{max}$ using monomer CE in a graphical representation, it can clearly be seen that TASTTA, the initiator of formula (III), requires the shortest amount of time to reach maximum heat generation by a large margin, followed by DPITTA of formula (II). In light of this, Examples 3 and 4 according to the invention give better results with time periods of 16 sec and 11 sec, respectively, compared to all three prior art initiators (17 sec, 37 sec, 73 sec)—sometimes even by large margins.

A similar pattern can be seen in FIG. 2 for the BADGE monomer: again, the TASTTA initiator of Example 6 requires the shortest amount of time to reach $t_{max}$, in this case, however, on a par with CYRACURE® UVI 6976 of Comparative Example 6 (both 25 sec) and just ahead of DPITTA of Example 5 (33 sec). Both of the known initiators, IOC8 (38 sec), and especially PFPB (84 sec) showed markedly higher values.

Results for $t_{95\%}$ for both monomers can be seen in FIGS. 3 and 4. For CE in FIG. 3, TASTTA of Example 4 according to the invention again achieving the best score (348 sec), closely followed by IOC8 of Comparative Example 1 (350 sec) and, by a wider margin, DPITTA of Example 3 (504 sec), UVI 6976 of Comparative Example 3 (509 sec) and again PFPB of Comparative Example 4 ranking last (540 sec).

Surprisingly, however, the situation in FIG. 4 is a completely different one. DPITTA of Example 5 with BADGE as a monomer is leading by a large margin (46 sec), followed by TASTTA of Example 6 (171 sec). Again, the best known initiator was IOC8 of Comparative Example 4, however with 242 sec, the time until 95% of the entire reaction heat were released was more than 5 times longer. They are followed by PFPB with 355 sec (Comparative Example 5) and trailing behind by a large margin here is UVI 6976 of Comparative Example 6 (632 sec).

Results for area, i.e. the area under the curve, showing released reaction heat and as such serves as a measure for conversion are similar to those for $t_{95\%}$. As can be seen in FIG. 5, for CE as monomer, TASTTA of Example 4 is still ahead, followed by the two known initiators IOC8 and UVI 6976 and DPITTA, and PFPB again trailing behind. By contrast however, in FIG. 6, DPITTA of Example 5 is leading the field by a large margin, followed by IOC8, TASTTA and PFPB, and finally UVI 6976 trailing behind by a large margin, when using BADGE.

Thus, FIGS. 1 to 6 clearly show that for any of the three measured parameters, an embodiment of the invention is leading the field—often by a large margin.

Figure 7:
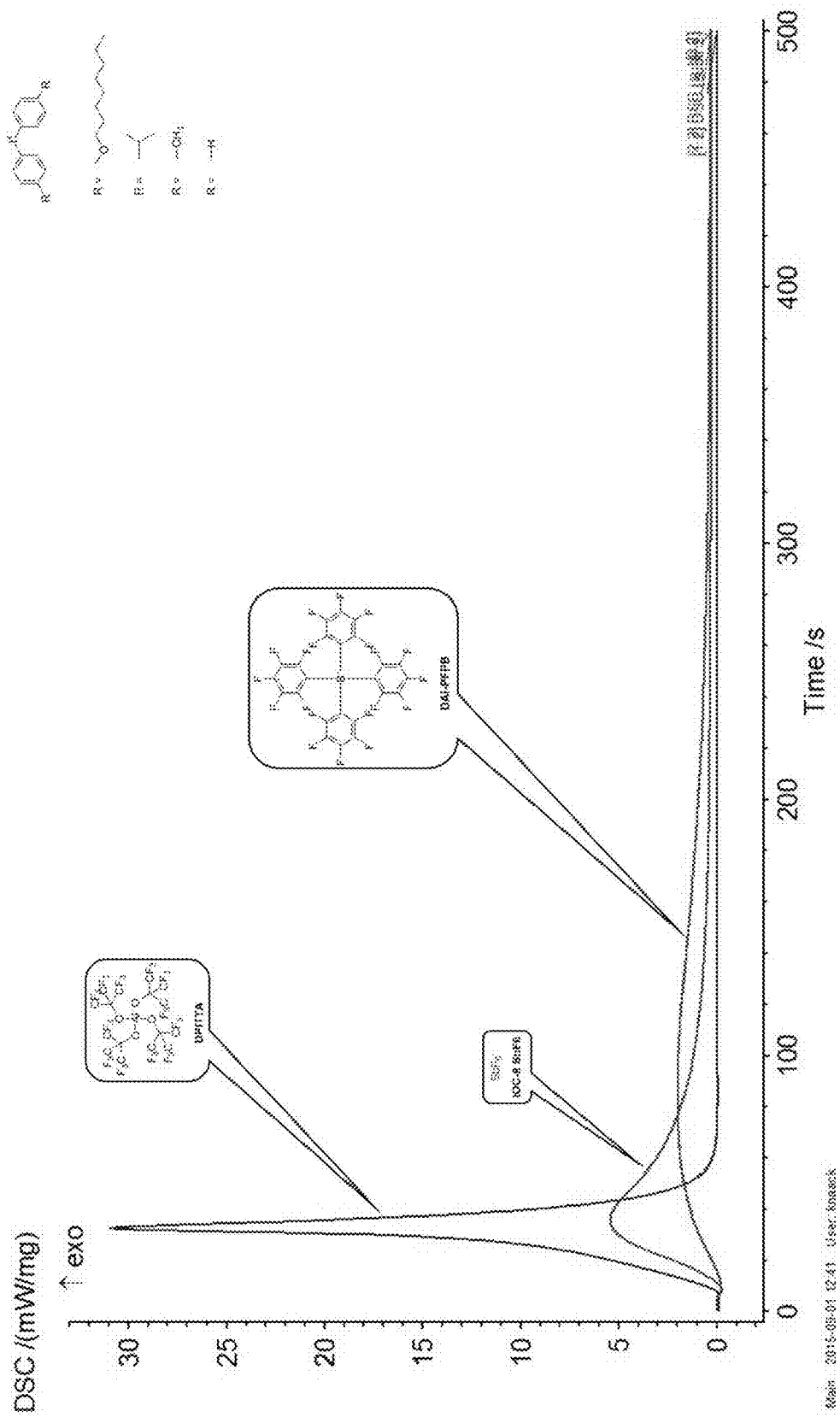
FIGS. 7 to 17 show recorded DSC curves.
Figure 8:
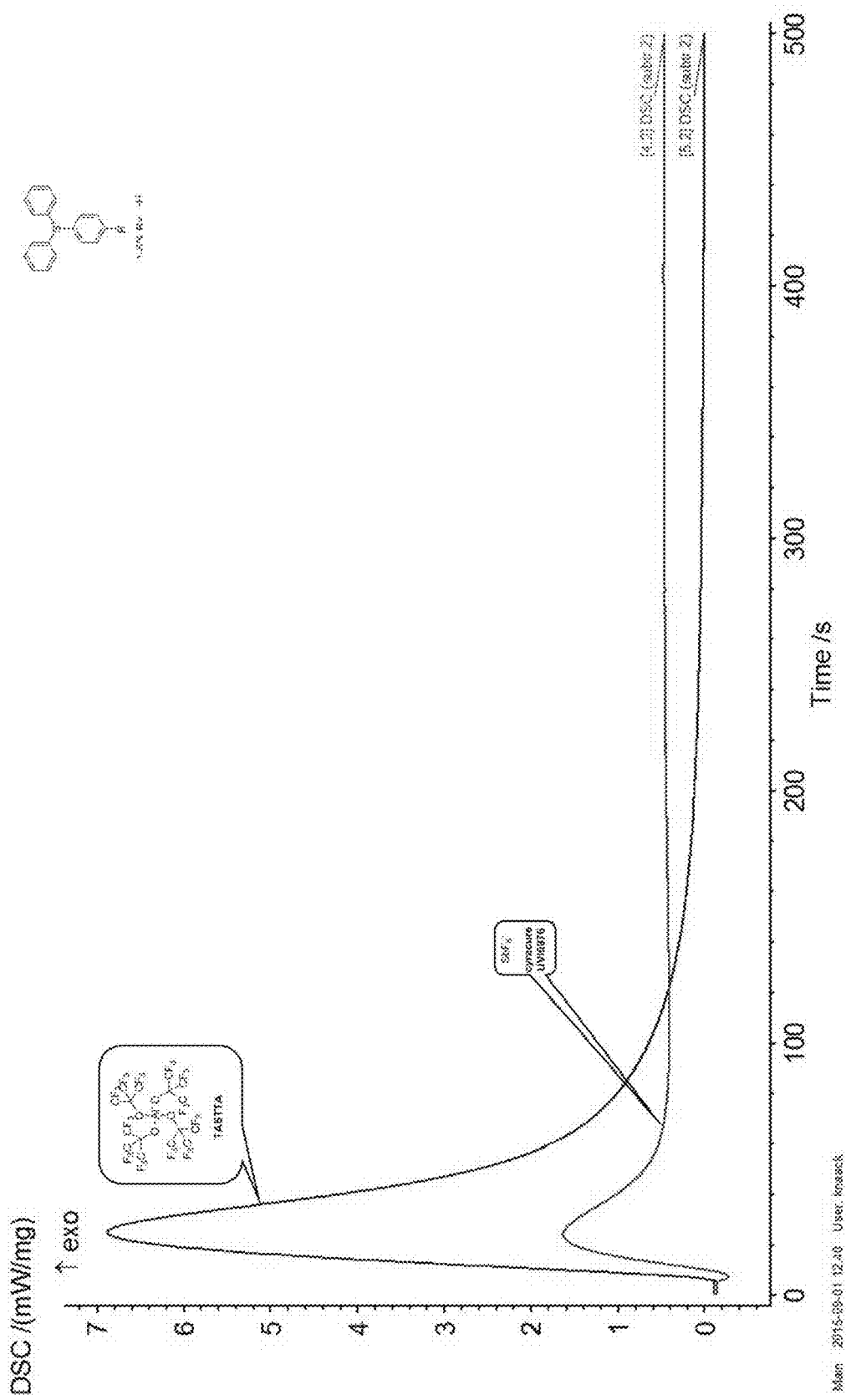

Conclusively, in FIGS. 7 and 8, both of the embodiments of the invention are individually compared to known initiators with similar structures, i.e. iodonium (FIG. 7) and sulfonium salts (FIG. 8), respectively, using their DSC curves in which heat development (in mW/mg) is applied as a measure for the polymerization reaction rate vs time (in sec).

In FIG. 7, where DPITTA is applied together with both of the known iodonium ion-based initiators IOC8 and PFPB, as well as in FIG. 8 for the sulfonium initiators TASTTA and UVI 6976, a similar pattern can be observed: the polymerization performed according to the invention sets off considerably faster and is also substantially completed after a considerably shorter amount of time than when using prior art initiators.

Examples 7 and 8, Comparative Examples 7 to 10

Within this group of examples, the newly developed photoinitiator of formula (II), DPITTA, was again compared to two other known initiators, DPI-PFPB and DPI-SbF$_6$, by means of photo-DSC measurements during the curing process of two other known difunctional monomers, BOB and BVC, all of which are depicted below.

Monomers:

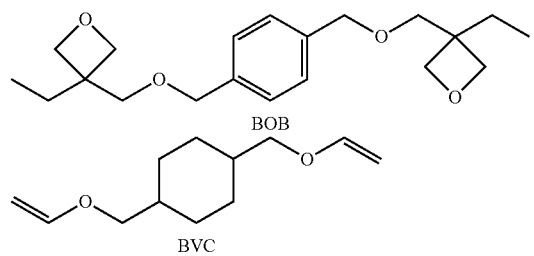

BOB

BVC

Initiators:

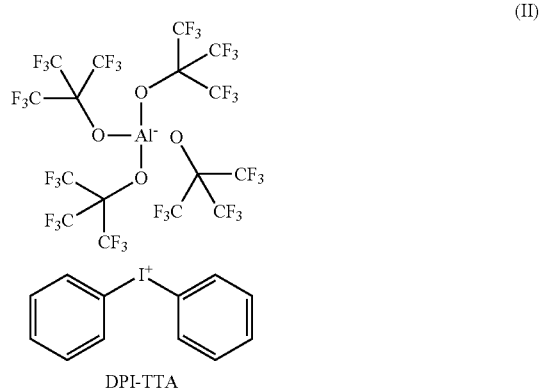

(II)

DPI-TTA

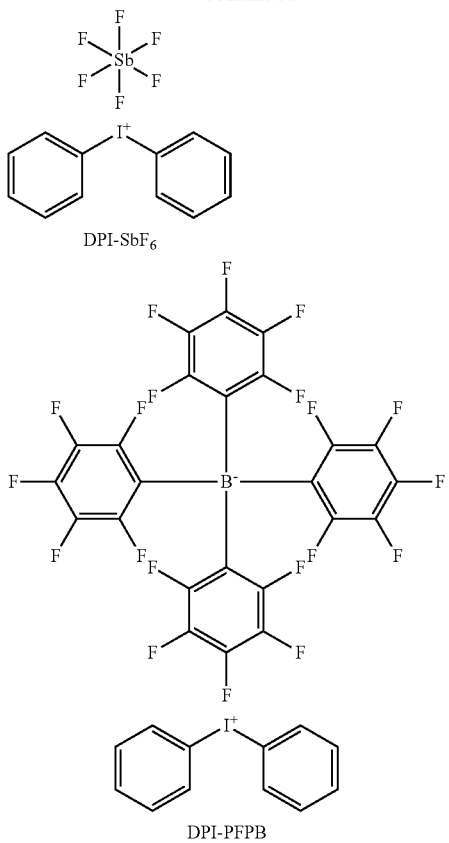

DPI-SbF$_6$

DPI-PFPB

For each formulation, 1 mol % of initiator, based on polymerizable groups, was weighed in and magnetically stirred at room temperature until fully dissolved. After that, 14 mg of each reaction mixture were weighed into open aluminum dishes, and the dishes were covered with coverslips.

DSC measurements were performed on a NETSCH DSC 204 F1 Phoenix under nitrogen atmosphere at 50° C., irradiation was applied through an Omnicure 2000 mercury-vapor lamp equipped with a wavelength filter of 320-500 nm. The UV light intensity was set at 1 W/cm$^3$, irradiation time was 9 mins. All measurements were done in triplicate, and the averaged values for each respective monomer are listed in Tables 3 and 4 below.

Consistent with Examples 3 to 6, $t_{max}$ designates the time until maximum heat generation is reached (in sec), and thus serves as a measure of how fast the gelling point and hence a high initial strength are reached, wherein shorter periods of time are desirable, and $t_{95\%}$ designates the time (in sec), after which 95% of the total reaction heat were released, and thus also constitutes a measure of the reaction rate, wherein again, lower values are advantageous. Moreover, within the following group of examples, the area under the photo-DSC curves were converted to polymerization conversion C (in %) on the basis of known values for the theoretical polymerization monomer heat. Finally, $R_p$ designates the polymerization rate which was also extrapolated directly from the photo-DSC results.

TABLE 3

BOB

| Example | initiator | C [%] | $t_{max}$ [s] | $t_{95\%}$ [s] | $R_p$ [mol · l$^{-1}$ · s$^{-1}$] |
|---|---|---|---|---|---|
| B7 | DPITTA | 72.5 | 24.3 | 68 | 0.130 |
| V7 | DPI-PFPB | 64.7 | 25.9 | 85 | 0.067 |
| V9 | DPI-SbF$_6$ | 68.3 | 28.7 | 87 | 0.068 |

In the dioxetan resin BOB, the novel initiator DPITTA shows its clearly superior polymerization performance across all parameters compared to both of the other initiators. Conversions of more than 72% were achieved resulting in values that were higher by 6% and 12%, respectively, than those of DPI-SbF$_6$ (around 68%) and DPI-PFPB (around 65%). Maximal Peak was also reached within the shortest amount of time using DPITTA, and $t_{95\%}$ values for this initiator are considerably lower than for comparative initiators. However, DPITTA's benefits can be perceived most markedly at the polymerization rate which was almost twice as high as for DPI-PFPB and DPI-SbF$_6$.

TABLE 4

BVC

| Example | initiator | C [%] | $t_{max}$ [s] | $t_{95\%}$ [s] | $R_p$ [mol · l$^{-1}$ · s$^{-1}$] |
|---|---|---|---|---|---|
| B8 | DPITTA | 83.7 | 7.0 | 24 | 0.517 |
| V8 | DPI-PFPB | 88.3 | 7.1 | 24 | 0.543 |
| V10 | DPI-SbF6 | 77.8 | 7.1 | 24 | 0.516 |

Values given in Table 4 that were obtained with the vinyl ether monomer BVC, were similar or even (almost) identical across all three of the tested initiators. This however can be attributed to the fact that the cationic polymerization of vinyl ethers generally occurs very quickly; this is why hardly any differences could be observed here.

Figure 9:
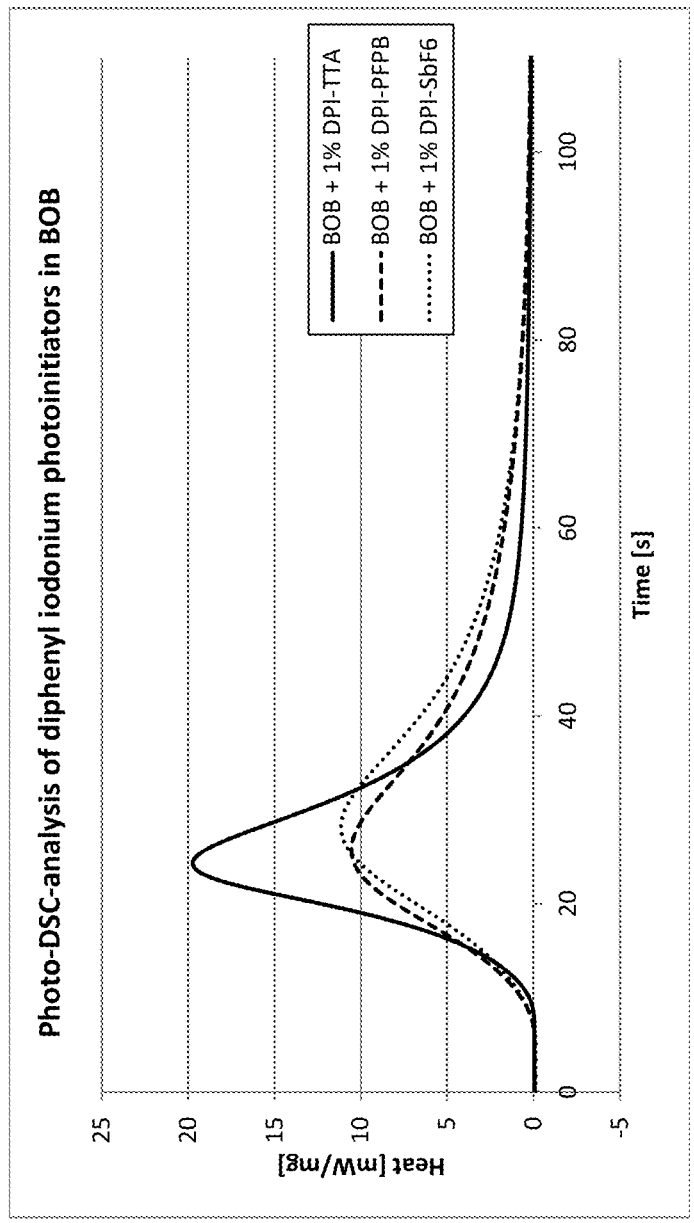
Figure 10:
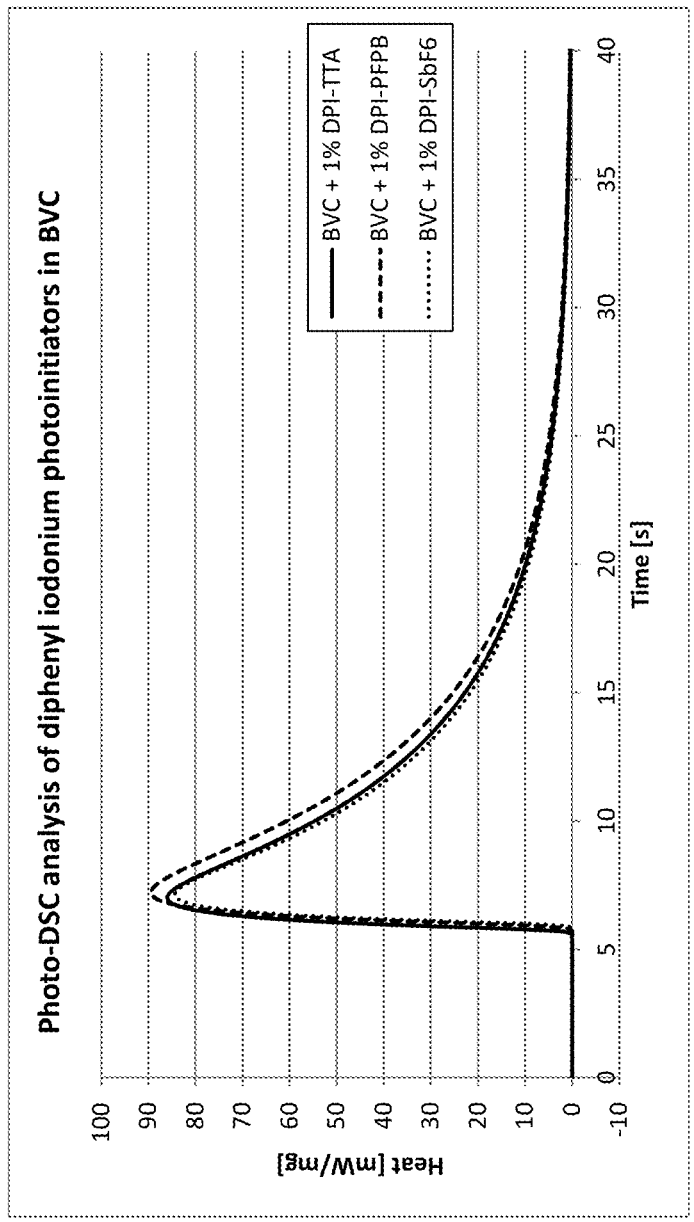

In FIGS. 9 and 10, both embodiments of the invention of Examples 7 and 8 are each compared to the structurally similar known diphenyliodonium initiators in BOB (FIG. 9) and BVC (FIG. 10), respectively, through DSC curves, in which heat development (in mW/mg) is applied as a measure for the polymerization reaction rate vs time (in sec).

In FIG. 9, where DPITTA is co-applied to BOB with both of the known iodonium ion-based initiators, DPI-PFPB and DPI-SbF$_6$, as well as in FIG. 10 for initiators in monomer BVC, a similar pattern can be observed: the polymerization performed according to the invention sets off considerably faster and is also substantially completed after a considerably shorter amount of time than using prior art initiators.

Example 9

Preparation of tris(4-((4-acetylphenyl)thio)phenyl)sulfonium-tetrakis(perfluoro-t-butyl-oxy)aluminate (IV) (TAPS-TTA)

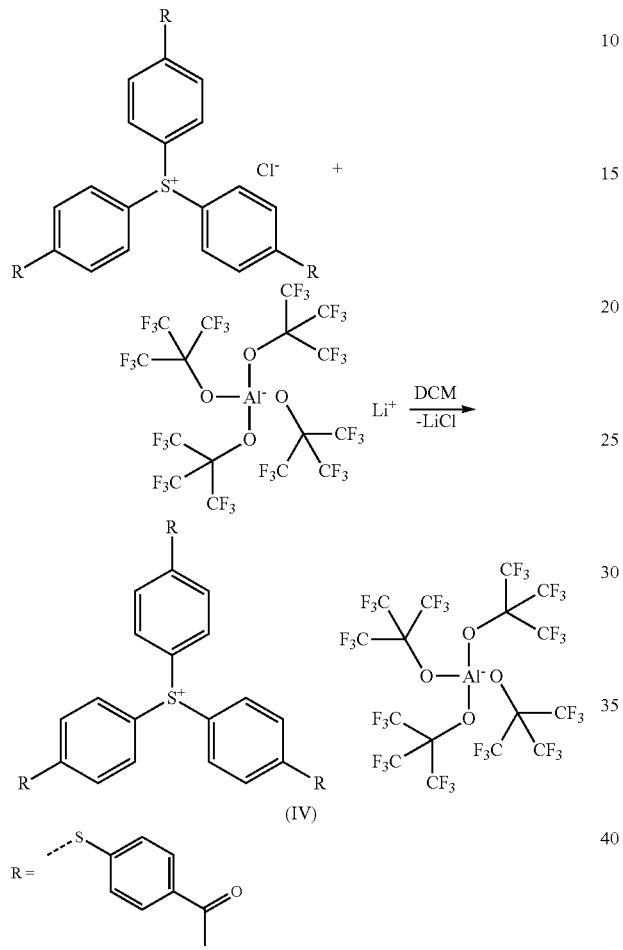

The reaction above was performed under argon atmosphere and in a laboratory using orange lighting conditions. In a crimp neck vial equipped with a magnetic stirrer, lithium tetrakis(perfluoro-t-butyloxy)aluminate (77.16 mg, 0.0792 mmol) was precharged, sealed with a septum and an aluminum cap and dissolved in 9 ml of dichloromethane while stirring. In a separate vessel, tris(4-((4-acetylphenyl)thio)phenyl)sulfoniumchloride (59.63 mg, 0.0796 mmol) was dissolved in 2 ml of dichloromethane, added dropwise to the reaction solution using a syringe, and washed with 1 ml of $CH_2Cl_2$. In doing so, the formation of a white precipitate could be observed. The reaction was stirred overnight and then controlled using TLC (solvent: $CH_2Cl_2$). The reaction mixture was transferred into a separation funnel for work-up and extracted with 3×5 ml of water. The solvent of the organic layer was evaporated off on a rotary evaporator, and the residue was stored overnight in a fridge at 4° C., in order to allow for crystallization. Subsequently, the material was dried in fine vacuum for 4 hours. The product (106 mg, theor. 80%) was obtained as a white solid. $^1$H-NMR (200 MHz, $CDCl_3$) δ (ppm): 8.00 (d, 6H, J=8.60 Hz, Ar), 7.59 (d, 6H, J=8.60 Hz, Ar), 7.34 (d, 6H, J=8.56 Hz, Ar), 7.26 (d, 6H, J=9.00 Hz, Ar), 2.62 (s, 9H, $CH_3$). TLC ($CH_2Cl_2$) $R_f$=0.15

Examples 10 and 11, Comparative Examples 11 to 14

By analogy with the diphenyliodonium photoinitiators, the substituted triarylsulfonium photoinitiator (IV), TAPS-TTA, was also compared to known prior art initiators using photo-DSC, in particular TAPS-TFSM and TAPS-PFPB, that are commercially available under the trade names Irgacure GSID-26-1 and Irgacure 290, respectively, as high-performance photoinitiators for industrial applications. All three initiators comprise the same cationic chromophore ("TAPS") having the same light absorption properties, which is why the effect of the anion on polymerization performance and initiation efficiency can herein be compared directly. Consistent with Examples 3 to 6, CE and BADGE were used as monomers.

Monomers:

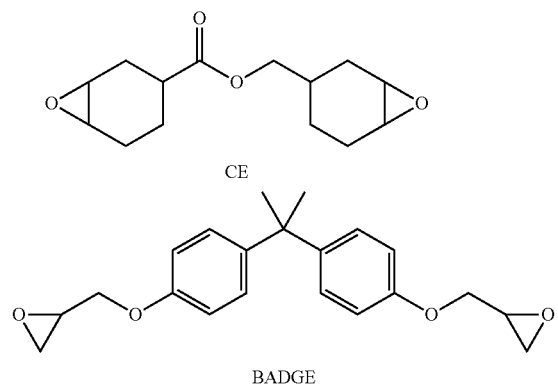

Initiators:

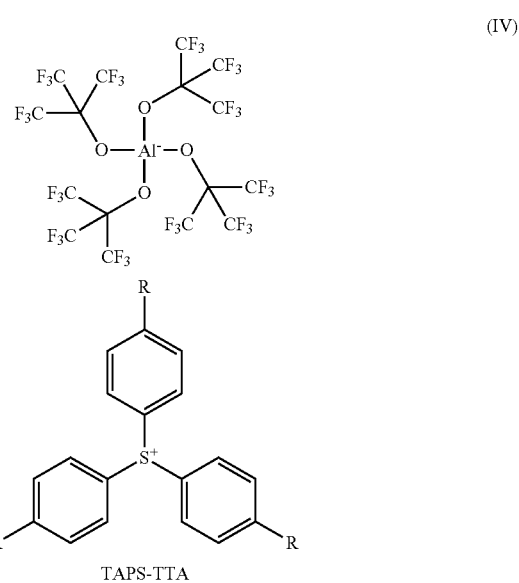

-continued

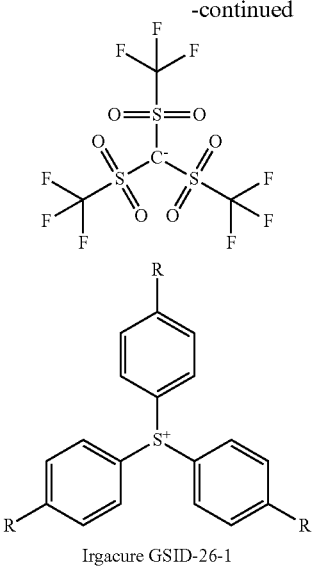
Irgacure GSID-26-1

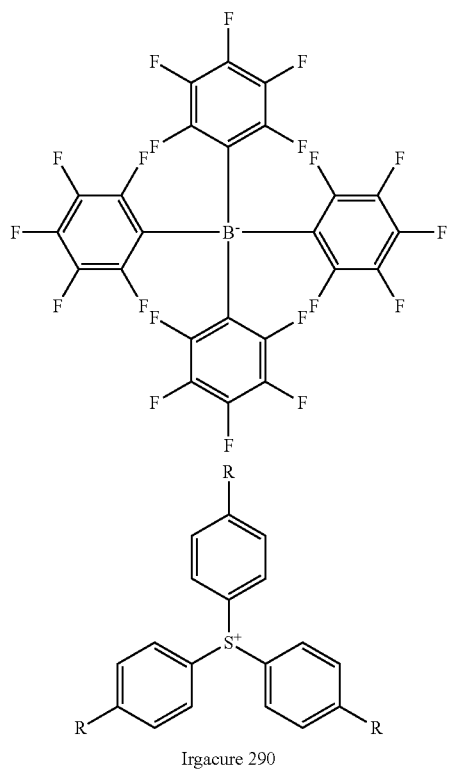
Irgacure 290

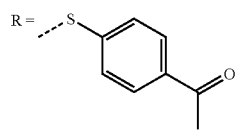

Testing parameters correspond to those used in Examples 7 and 8 above, except that irradiation intensity was set to 3 W/cm². Again, the results are presented as mean values of determinations conducted in triplicate in Tables 5 and 6 below.

TABLE 5

| | | CE | | | |
|---|---|---|---|---|---|
| Example | initiator | C [%] | $t_{max}$ [s] | $t_{95\%}$ [s] | Rp [mol · l⁻¹ · s⁻¹] |
| B10 | TAPS-TTA | 42.6 | 10.6 | 216 | 0.076 |
| V11 | TAPS-PFPB | 42.6 | 10.1 | 254 | 0.076 |
| V13 | TAPS-TFSM | 40.2 | 12.4 | 232 | 0.071 |

While results for C, $t_{max}$ and $R_p$ were comparable or (almost) identical, respectively, the initiator TAPS-TTA according to the invention shows its superior qualities at $t_{95\%}$. Here, the time until reaching a conversion of 95% is considerably shorter; therefore, this novel initiator performs even better than industrial high-performance initiators.

TABLE 6

| | | BADGE | | | |
|---|---|---|---|---|---|
| Example | initiator | C [%] | $t_{max}$ [s] | $t_{95\%}$ [s] | Rp [mol · l⁻¹ · s⁻¹] |
| B11 | TAPS-TTA | 64.3 | 16.8 | 240 | 0.049 |
| V12 | TAPS-PFPB | 62.1 | 17.1 | 243 | 0.046 |
| V14 | TAPS-TFSM | 54.4 | 16.1 | 237 | 0.042 |

With otherwise comparable values, the novel initiator according to the invention achieves the highest conversion and therefore performs better than both industrial initiators even when using this monomer.

Figure 11:
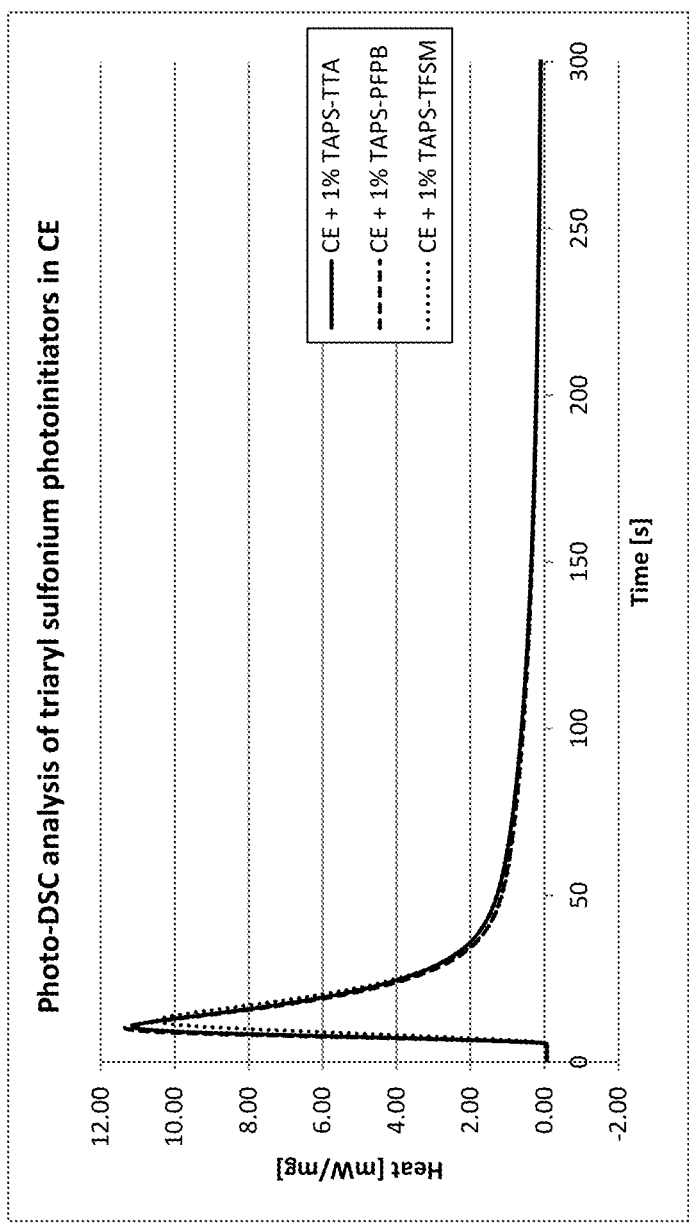
Figure 12:
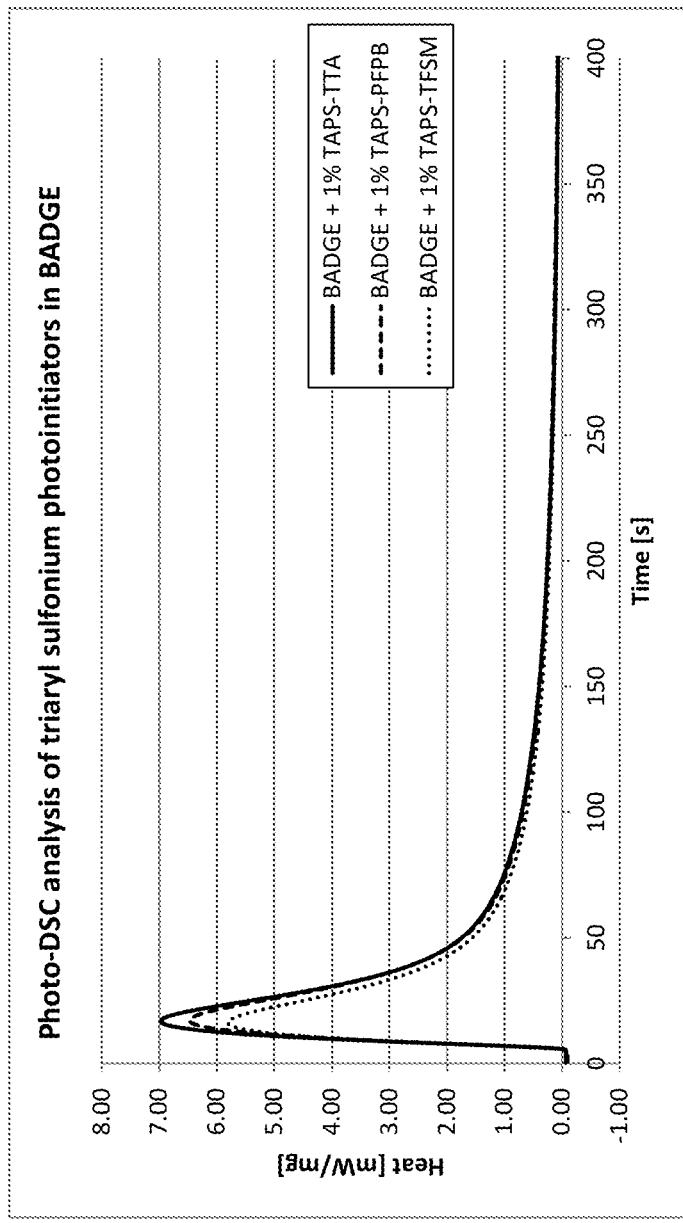

In FIGS. 11 and 12, the photo-DSC curves of all three initiators are compared based on heat development in CE (FIG. 11) and BADGE (FIG. 12), respectively. In both cases, the strongest heat development for this embodiment of the invention could be observed (in BADGE on a par with TAPS-PFPB).

Examples 12 to 17, Comparative Examples 15 to 20

As diphenyliodonium photoinitiators tend to absorb best within a wavelength range of below 250 nm, sensitizers are frequently added allowing for photoinitiation using a light source emitting radiation at 400-500 nm. Therefore, the Omnicure S2000 helium medium pressure lamps used as a light source for the photo-DSC experimental design was provided with a filter permeable at a wavelength of 400-500 nm. Using the two photo initiators DPITTA and DPI-SbF₆, photo-sensitive formulations with varying concentrations of two sensitizers, isopropylthioxanthone (ITX) and perylene, were produced in the BADGE monomer. Photo-DSC measurements were conducted in analogy to Examples 10 and 11 using an intensity of 3 W/cm³, and the results are presented in Tables 7 to 12 below.

Initially, formulations of both initiators and without adding any sensitizer were irradiated using the new lamp. The results can be seen in Table 7.

TABLE 7

Photo-DSC analysis without sensitizer at 400-500 nm

| Example | initiator | C [%] | $t_{max}$ [s] | $t_{95\%}$ [s] | Rp [mol·l$^{-1}$·s$^{-1}$] |
|---|---|---|---|---|---|
| B12 | DPITTA | 45 | 166 | 297 | 0.007 |
| V15 | DPI-SbF$_6$ | — | — | — | — |

While no polymerization reaction could be detected for DPI-SbF$_6$, DPITTA achieved a conversion of approximately 45% even without using a sensitizer.

Thereafter, 0.05% and 0.10% ITX were added as sensitizer, respectively.

TABLE 8

Photo-DSC analysis with 0.05% ITX at 400-500 nm

| Example | Initiator | C [%] | $t_{max}$ [s] | $t_{95\%}$ [s] | Rp [mol·l$^{-1}$·s$^{-1}$] |
|---|---|---|---|---|---|
| B13 | DPITTA | 95 | 16 | 32 | 0.382 |
| V16 | DPI-SbF$_6$ | 83 | 17 | 31 | 0.299 |

TABLE 9

Photo-DSC analysis with 0.10% ITX at 400-500 nm

| Example | Initiator | C [%] | $t_{max}$ [s] | $t_{95\%}$ [s] | Rp [mol·l$^{-1}$·s$^{-1}$] |
|---|---|---|---|---|---|
| B14 | DPITTA | 92 | 15 | 30 | 0.368 |
| V17 | DPI-SbF$_6$ | 85 | 15 | 30 | 0.344 |

As can be seen according to the present invention, a considerably (Example 13) and moderately (Example 14) higher polymerization rate could be achieved on the one hand using comparable timing, respectively, and that primarily, significantly higher conversions can be achieved on the other.

Figure 13:
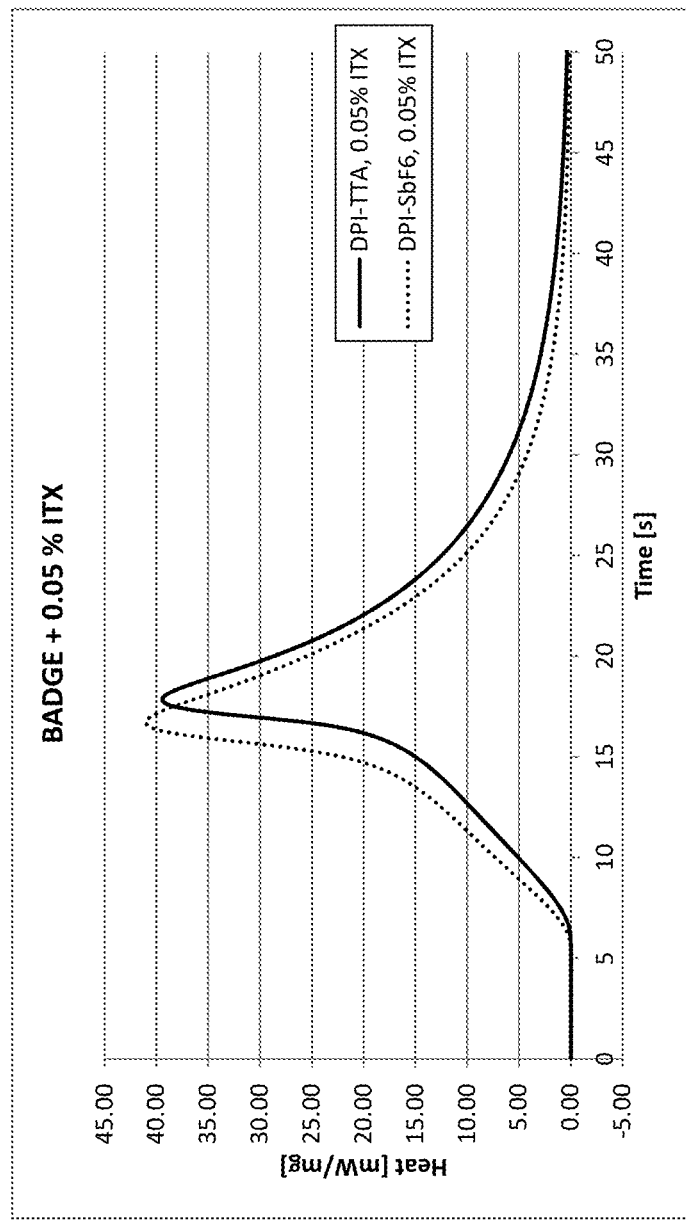
Figure 14:
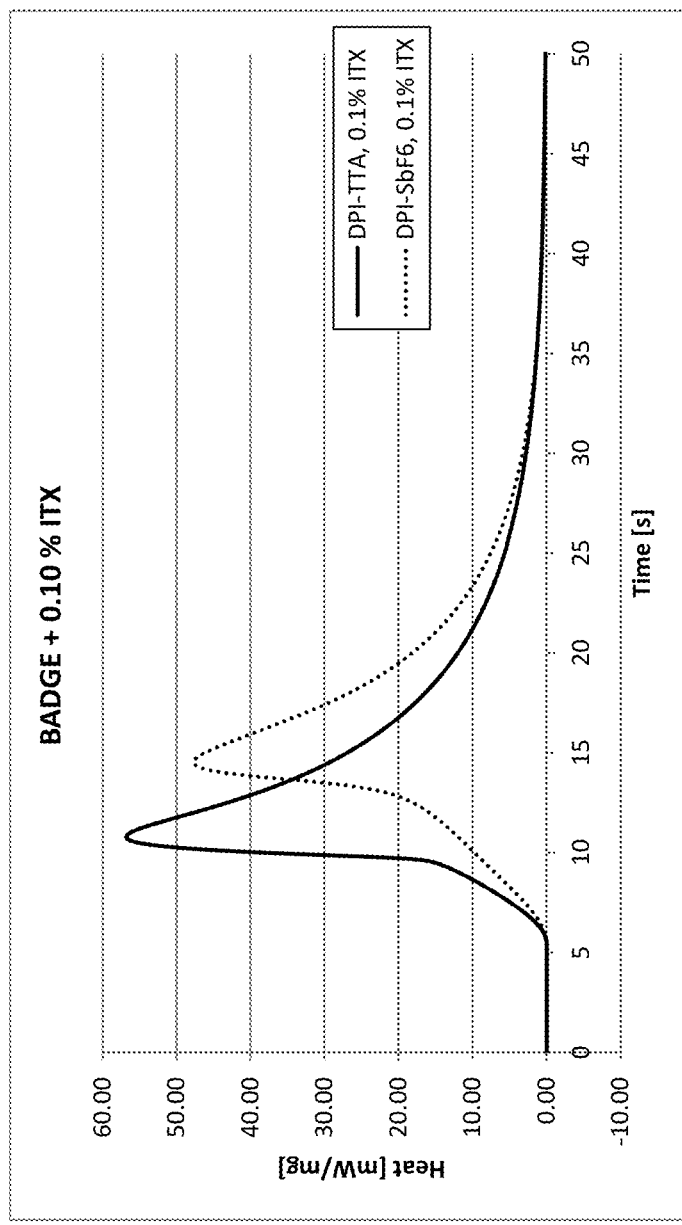

In turn, in FIGS. 13 and 14, reaction heat development is compared, the former case showing that surprisingly, the known initiator performs better at lower ITX concentrations, however initiation through DPITTA occurring at a considerably faster and more intense rate when the amount of sensitizer is doubled.

Figure 15:
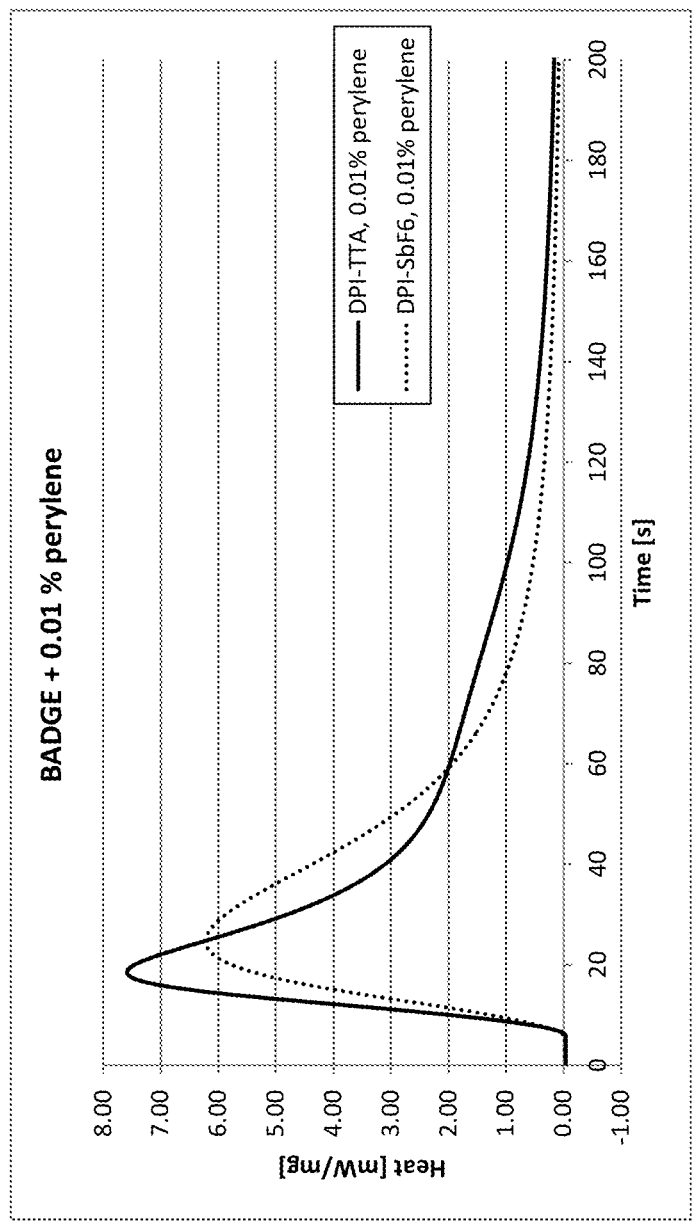
Figure 16:
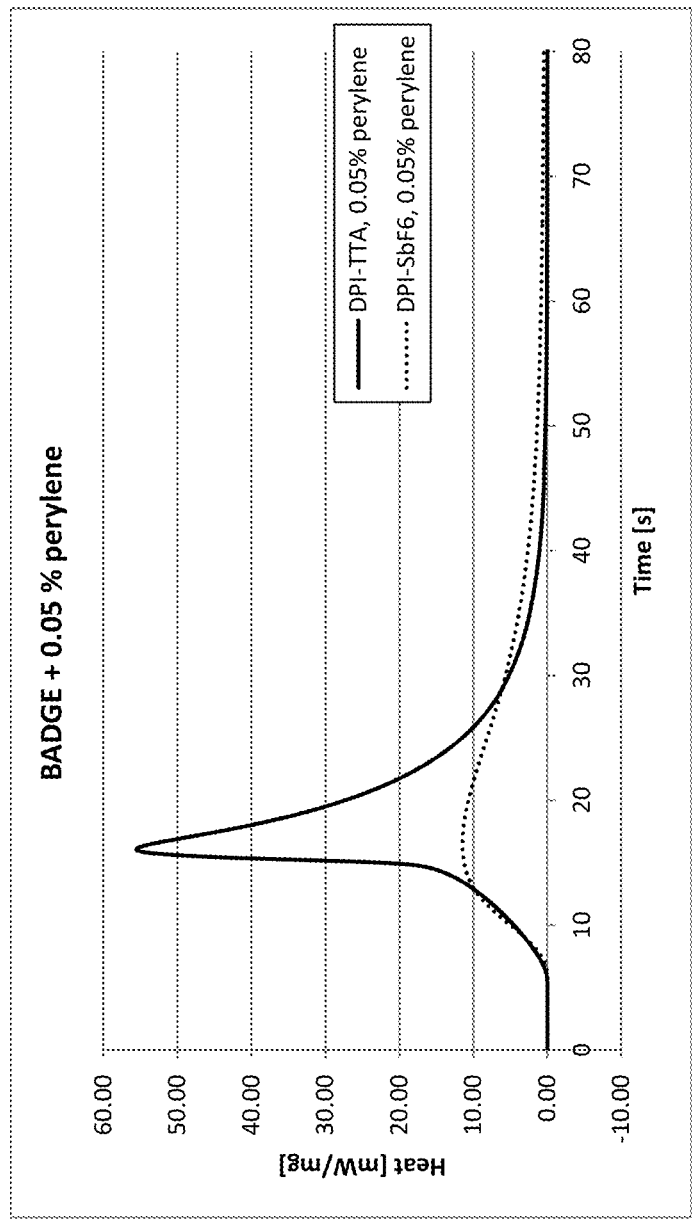
Figure 17:
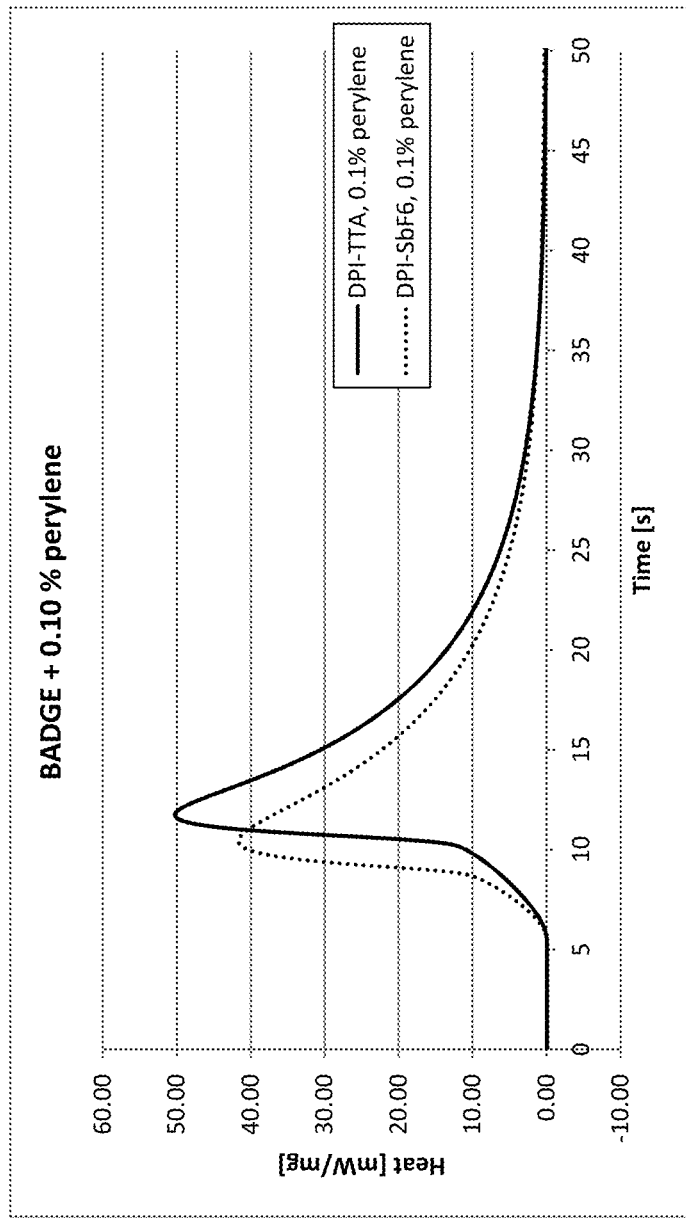

Subsequently, both initiators were combined with three varying concentrations of perylene as a sensitizer, in particular 0.01%, 0.05%, and 0.10%, as the absorption spectrum of perylene corresponds well with the Omnicure lamp's emission spectrum allowing for a lower sensitizer concentration. The results are shown in the following Tables 10 to 12 below and in FIGS. 15 to 17.

TABLE 10

0.01% perylene

| Example | Initiator | C [%] | $t_{max}$ [s] | $t_{95\%}$ [s] | Rp [mol·l$^{-1}$·s$^{-1}$] |
|---|---|---|---|---|---|
| B15 | DPITTA | 67 | 18 | 180 | 0.052 |
| V18 | DPI-SbF$_6$ | 60 | 24 | 132 | 0.047 |

TABLE 11

0.05% perylene

| Example | Initiator | C [%] | $t_{max}$ [s] | $t_{95\%}$ [s] | Rp [mol·l$^{-1}$·s$^{-1}$] |
|---|---|---|---|---|---|
| B16 | DPITTA | 92 | 16 | 32 | 0.400 |
| V19 | DPI-SbF$_6$ | 67 | 17 | 159 | 0.087 |

TABLE 12

0.10% perylene

| Example | Initiator | C [%] | $t_{max}$ [s] | $t_{95\%}$ [s] | Rp [mol·l$^{-1}$·s$^{-1}$] |
|---|---|---|---|---|---|
| B17 | DPITTA | 89 | 12 | 30 | 0.373 |
| V20 | DPI-SbF$_6$ | 82 | 10 | 49 | 0.299 |

Overall, Tables 15 to 17 clearly show that DPITTA is superior compared to the known initiator DPI-SbF$_6$ across all test parameters.

Thus, DPITTA is also achieving better results in the presence of sensitizers than the commercially available comparative initiator.

Example 18—Application Example "Chemical Anchor"

Chemical anchors are formulations allowing for fixing screws, bolts, threaded rods and the like in bores. There is a choice between two options: fast reaction times with a short pot life or a long pot life associated with a disadvantageous very long top life with very fast curing. The use of formulations which may be cured by radical induced cationic frontal polymerization (RICFP) as a mass for chemical anchors is thus advantageous, combining a long pot life with very fast curing. The reaction may be initiated by irradiation with (UV) light or by the local application of heat (for example using a soldering iron or a hot air gun).

Formulation

A typical formulation consists of an epoxide resin, such as bisphenol A diglycidyl ether, a cationic photoinitiator, such as the initiator DPITTA of the invention, and a radical thermal initiator, such as benzopinacol. To produce the formulation, the initiators are dissolved in as small an amount of dichloromethane as possible and then mixed with the resin. Dichloromethane is then completely removed under stirring in vacuo at 50° C.

TABLE 13

Typical formulation for a non-pre-treated bore

| Component | concentration [mol-%] | mass [g] | note |
|---|---|---|---|
| bisphenol A diglycidyl ether | — | 27.23 | BADGE |
| diphenyliodonium tetrakis(perfluoro-tert-butyl) aluminate | 0.5 | 0.50 | DPI TTA |
| 1,1,2,2-tetraphenyl ethanediol | 4.0 | 1.17 | TPED, Benzopinacol |
| 3-glycidoxypropyl trimethoxysilane | 7.2 | 1.36 | GPTMS Primer |

Preparing the Bores

A percussion drill was used to drill bores with a diameter of 14 mm into granite, concrete, and bricks. The bores were then cleaned with compressed air in order to remove any adherent dust. As the adhesion between the rocks and the epoxide formulations may be insufficient, it may be improved using a primer. The primer may either be mixed with the formulation or pre-applied into the bores. In the present case, 3-glycidoxypropyltrimethoxysilane was used as a primer.

Method A: Directly Pre-Treating the Bores

As a pretreatment, a formulation comprising 50 ml of ethanol (96%), 0.23 ml of 3-glycidoxypropyltrimethoxysilane, and 1.5 ml diluted acetic acid (glacial acetic acid:water 1:10) was prepared. The bores were completely filled with this solution which was allowed to act for approx. 1 hour at room temperature. The rocks (concrete, granite, and bricks) were then kept in an oven at 60° C. overnight. The next day, the solution had completely dried. Bores which have undergone such a pretreatment will then be referred to as "primed".

Method B: Adding the Primer to the Reaction Formulation

Together with the initiators, an additional 5% by weight 3-glycidoxypropyl trimethoxysilane were added to the above-described resin formulations. After adding the resin, the solvent was removed and the formulations were degassed.

Threaded Rods

The threaded rods (diameter of 12 mm) were cut to a length of 11 cm and their edges were deburred in order to install them in the rocks. The size of the bore (14 mm) and the diameter of the threaded rods result in an annular gap of 1 mm.

Polymerization

About half of the volume of the bores was filled with the reaction formulation, the threaded rod being then placed at the center. The reaction was then initiated by irradiating the visible surface of the formulation using a UV Vis light source equipped with a 320 to 500 nm filter via an optical guide filled with fluid and having a diameter of 8 mm. Irradiation intensity at the optical guide's outlet was set to 3 W/cm$^2$.

Tensile Strength Experiments

The obtained samples were then examined using a tensile test machine (Zwick Z250) to test the polymer's adhesion between the threaded rod and the rocks. A second threaded rod was fixed to the threaded rods using two nuts and then clamped in the tensile test machine. The rocks were fixed using a counterbearing below them.

The test was carried out at a speed of 10 mm/min. Table 14 shows the typical maximally required forces. It has to be noted that there is no significant difference in the results achieved when adding the primer to the formulation and those achieved by pre-treating the bores. Furthermore, the bricks were always partially destroyed in the course of the attempt to tear the rods out.

TABLE 14

Force required to remove threaded rods from the bore

| Material | Maximum force [N] |
| --- | --- |
| Concrete | 1100 |
| Brick | 1050 |
| Granite | 500 |

In summary, as shown above, the Examples according to the invention strikingly confirm the present invention's superiority over the state of the art, which was not to be expected prior to the inventor's investigations.

The invention claimed is:

1. Diphenyliodonium-tetrakis(perfluoro-t-butyloxy)aluminate of the following formula (II):

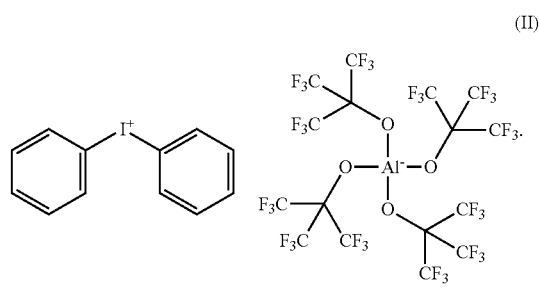

2. Triphenylsulfonium-tetrakis(perfluoro-t-butyloxy)aluminate, optionally substituted with phenylthio and 4-diphenylsulfoniophenylthio, of the following formula (III):

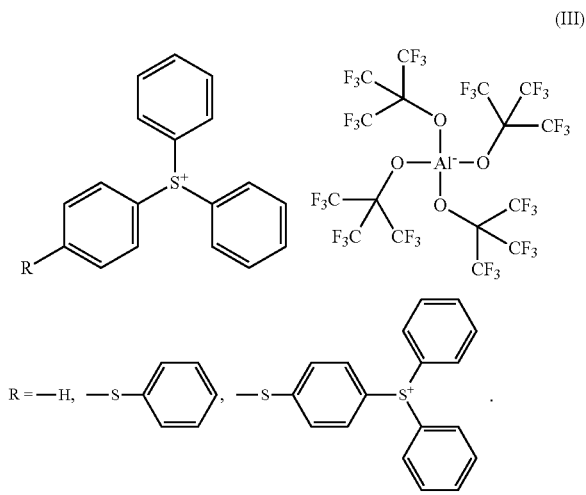

3. Tris(4-((4-acetylphenyl)thio)phenyl)sulfonium-tetrakis (perfluoro-t-butyl-oxy)aluminate of the following formula (IV):

-continued

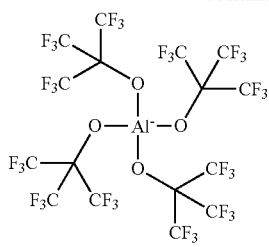

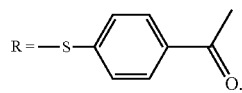

4. A method of polymerizing cationically polymerizable monomers comprising using aryliodonium and/or arylsulfonium salts of the tetrakis-(perfluoro-t-butyloxy)aluminate anion of the following formula (I):

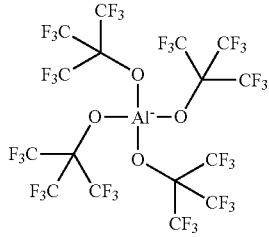 (I)

as cationic initiators cleavable by light and/or free radicals.

5. The method according to claim 4, wherein diphenyliodonium-tetrakis-(perfluoro-t-butyloxy)aluminate of the following formula (II) is used as a cationic initiator:

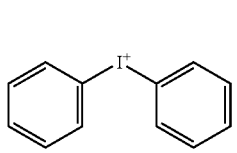 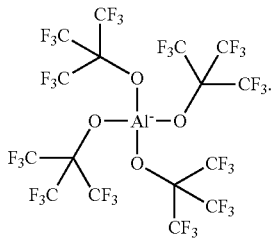 (II)

6. The method according to claim 4, wherein triphenylsulfonium-tetrakis-(perfluoro-t-butyloxy)aluminate of the following formula (III), optionally substituted with phenylthio or 4-diphenylsulfoniophenylthio, is used as a cationic initiator:

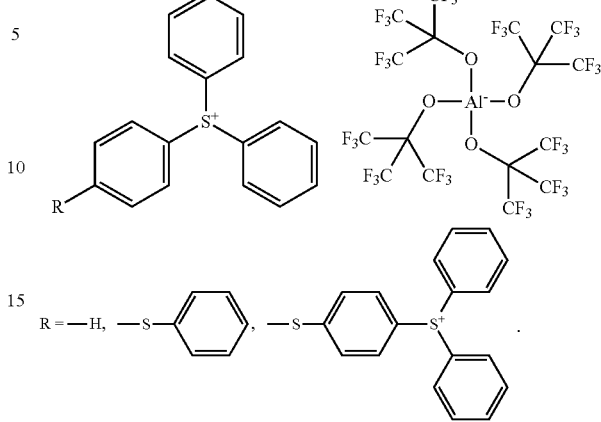 (III)

7. The method according to claim 4, wherein tris(4-((4-acetylphenyl)-thio)phenyl)sulfonium-tetrakis(perfluoro-t-butyloxy)aluminate of the following formula (IV) is used as a cationic initiator:

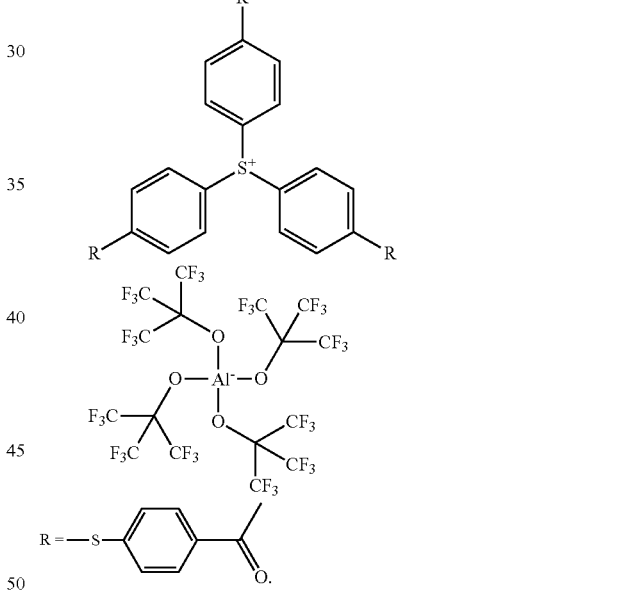 (IV)

8. The method according to claim 4, wherein the cationic polymerization is carried out as a ring-opening polymerization.

9. The method according to claim 8, wherein mono- or multivalent epoxides (oxiranes), thiiranes (epi sulfides), oxetanes, lactames, lactones, lactide, glycolide, tetrahydrofuran, or mixtures thereof are used as cationically polymerizable monomers.

10. The method according to claim 9, wherein one or more multivalent epoxides are used as cationically polymerizable monomers.

11. The method according to claim 4, wherein one or more multivalent vinyl ethers are used as cationically polymerizable monomers.

12. The method according to claim 4, wherein a reaction mixture to be polymerized further comprises one or more components selected from additional initiators, additional monomers, sensitizers, stabilizers, modifiers, regulators, solvents, fillers, dyes, pigments, and mixtures thereof.

13. The method according to claim 12, wherein the reaction mixture further comprises at least one thermal free radical initiator; and wherein the polymerization reaction is performed as a frontal polymerization.

* * * * *